US011994815B2

(12) United States Patent
Yoshida et al.

(10) Patent No.: US 11,994,815 B2
(45) Date of Patent: May 28, 2024

(54) HEATING APPARATUS AND IMAGE FORMING APPARATUS

(71) Applicant: CANON KABUSHIKI KAISHA, Tokyo (JP)

(72) Inventors: Tsuguhiro Yoshida, Kanagawa (JP); Atsushi Nakamoto, Tokyo (JP); Toshiyuki Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/690,477

(22) Filed: Mar. 9, 2022

(65) Prior Publication Data

US 2022/0299912 A1 Sep. 22, 2022

(30) Foreign Application Priority Data

Mar. 19, 2021 (JP) ................................ 2021-045687

(51) Int. Cl.
*G03G 15/20* (2006.01)

(52) U.S. Cl.
CPC ..... *G03G 15/2017* (2013.01); *G03G 15/2064* (2013.01)

(58) Field of Classification Search
CPC ........... G03G 15/2017; G03G 15/2053; G03G 2215/2003
See application file for complete search history.

(56) References Cited

U.S. PATENT DOCUMENTS

| | | | | |
|---|---|---|---|---|
| 8,798,514 | B2 † | 8/2014 | Tanaka | |
| 9,507,302 | B2 | 11/2016 | Taguchi | |
| 10,001,746 | B2 † | 6/2018 | Tanaka | |
| 11,054,773 | B2 | 7/2021 | Furuichi et al. | |
| 2012/0308279 | A1 * | 12/2012 | Tanaka | G03G 15/2053 399/329 |
| 2016/0327900 | A1 * | 11/2016 | Tanaka | G03G 21/1647 |
| 2021/0364961 | A1 * | 11/2021 | Sakai | G03G 15/2053 |

FOREIGN PATENT DOCUMENTS

| | | | |
|---|---|---|---|
| JP | 0444075 | A | 2/1992 |
| JP | 2016153856 | A | 8/2016 |
| JP | 2020148943 | A | 9/2020 |
| JP | 2021006878 | A | 1/2021 |

* cited by examiner
† cited by third party

*Primary Examiner* — Thomas S Giampaolo, II
(74) *Attorney, Agent, or Firm* — Venable LLP

(57) ABSTRACT

A heating apparatus includes a tubular film, a heater, a first support member including a first regulation surface, and configured to rotatably support a first end of the film, a second support member including a second regulation surface, and configured to rotatably support a second end of the film, and a holding unit configured to hold the heater and determine a position of the heater in the longitudinal direction. Either one of the first support member and the second support member includes a positioning portion configured to determine a position of the holding unit in the longitudinal direction.

8 Claims, 19 Drawing Sheets

HEATING APPARATUS AND IMAGE FORMING APPARATUS

BACKGROUND OF THE INVENTION

Field of the Invention

This disclosure relates to a heating apparatus of thermally fixing a toner image on a recording material, which is suitably used for an image forming apparatus of an electrophotographic system such as a copier, a printer, a multifunction machine, and a facsimile, and the image forming apparatus including the heating apparatus.

Description of the Related Art

In an image forming apparatus, after a toner image has been formed on a recording material, the toner image is fixed on the recording material by a fixing unit which is an example of a heating apparatus. As the fixing unit used for the image forming apparatus, the fixing unit of a film heating type which is advantageous in terms of a quick start and conserving energy is widely used. This fixing unit includes a fixing film heated by a heater disposed on an inner circumferential side and a press roller forming a fixing nip portion by coming into contact with the fixing film, and fixes the toner image on the recording material by providing heat and pressure to the recording material passing through the fixing nip portion (refer to Japanese Patent Laid-Open No. H04-044075).

In a case of the unit described in Japanese Patent Laid-Open No. H04-044075, flanges rotatably supporting the fixing film are disposed at both ends in a longitudinal direction so as to regulate a so-called film skew by which the fixing film is skewed to the longitudinal direction intersecting with a conveyance direction of the recording material while rotating. The flanges are movably disposed in guide grooves in a fixing frame (in particular, both side plates), and the fixing nip portion is formed by pressing the flanges toward the press roller. Further, a stay for reinforcing a heater holder holding the heater is fitted to the flanges so as not to bend the heater holder under the pressure. Therefore, these heater holder and stay also move in accordance with movements of the flanges.

In the case of the fixing unit describe above, if a temperature irregularity is generated in the fixing nip portion in the longitudinal direction intersecting with the conveyance direction of the recording material, there is a possibility that the toner image becomes not to be fixed on the recording material properly. Therefore, at a time of assembling the fixing apparatus, it is necessary to consider a position of the heater in the longitudinal direction. However, it is likely that component tolerances in manufacturing occurs in the flange, the stay, the heater holder, and the like. Therefore, hitherto, a margin is disposed in the longitudinal direction so as to securely fit the stay and the flange to each other if the component tolerances occur in these components. Further, since it is possible that the stay and the heater holder are thermally expanded by the heat of the heater, a gap is disposed between an end face of the stay and the flange so that the end face of the stay does not come into contact with the flange in the longitudinal direction in a state where the stay and the flange are fitted to each other.

However, since, because of this reason, the gap different in a size depending on an individual fixing unit is produced between the stay and the flange, a rattling corresponding to this gap results in a variation of the position of the heater in the longitudinal direction, and possibly generates an individual difference.

SUMMARY OF THE INVENTION

According to one aspect of the present invention is a heating apparatus including a tubular film, a heater disposed in an inner space of the film, a first support member including a first regulation surface configured to regulate a movement of the film to a first direction toward a first end of the heater in a longitudinal direction of the heater, and configured to rotatably support a first end of the film in the longitudinal direction, a second support member including a second regulation surface configured to regulate a movement of the film to a second direction toward a second end opposite the first end of the heater in the longitudinal direction of the heater, and configured to rotatably support a second end of the film in the longitudinal direction, and a holding unit configured to hold the healer and determine a position of the heater in the longitudinal direction. Either one of the first support member and the second support member includes a positioning portion configured to determine a position of the holding unit in the longitudinal direction.

Further features of the present invention will become apparent from the following description of exemplary embodiments with reference to the attached drawings.

DESCRIPTION OF THE EMBODIMENTS

First Embodiment

Image Forming Apparatus

A healing apparatus of this embodiment will be described. In this embodiment, a fixing unit of a film heating type will be described as an example of the heating apparatus. At first, an image forming apparatus for which the fixing unit (heating apparatus) of this embodiment is suitably used will be described using FIG. 1.

Figure 1:
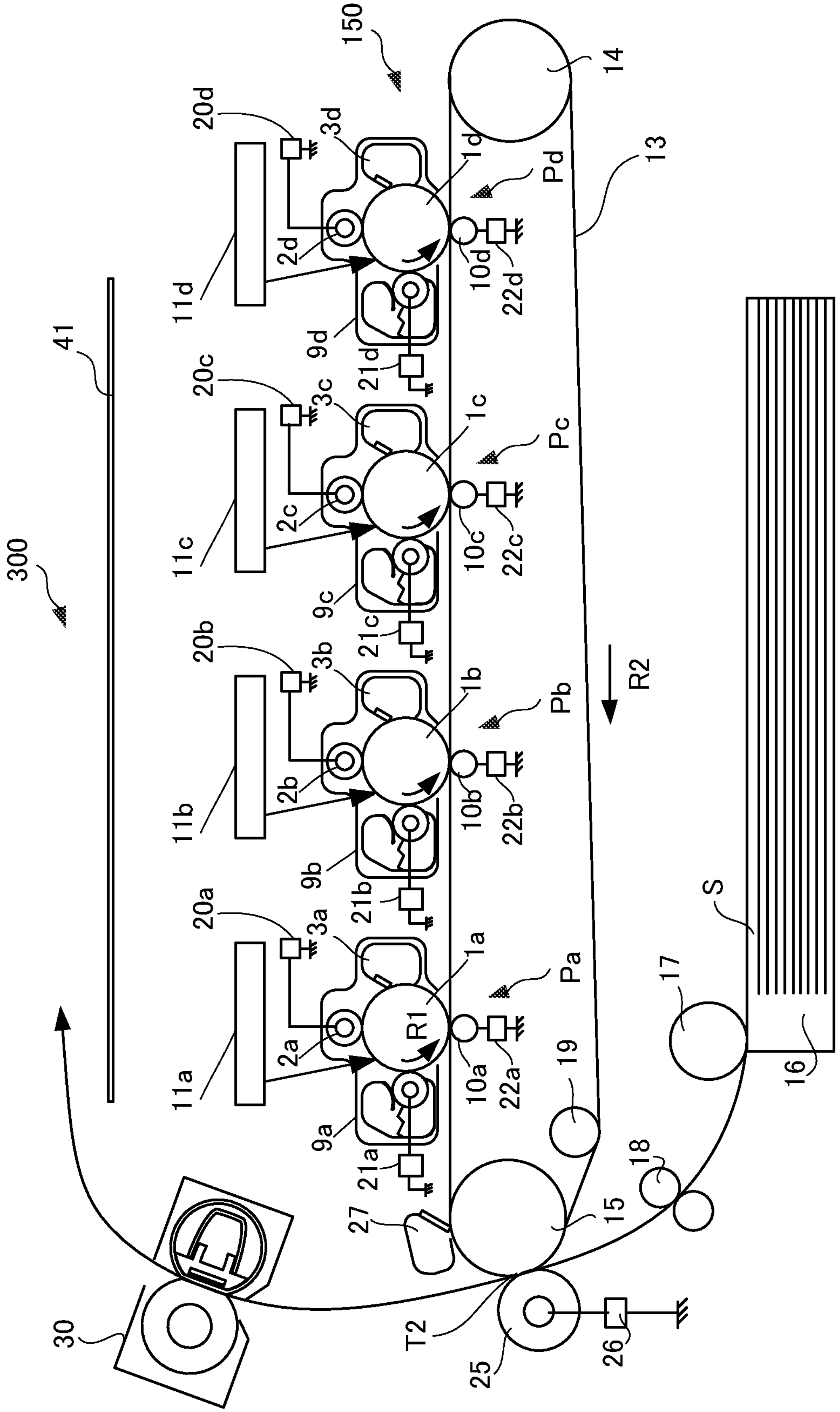
FIG. 1 is a schematic view showing an image forming apparatus for which a heating apparatus of this embodiment is suitably used.

An image forming apparatus 300 shown in FIG. 1 is a tandem type fill color printer of an electrophotographic system. The image forming apparatus 300 includes image forming units Pa Pb, Pc, and Pd respectively forming toner images of yellow, magenta, cyan, and black. The image forming apparatus 300 forms the toner image on a recording material S corresponding to an image signal from a document reading apparatus coupled to an apparatus body, not shown, or an external apparatus such as a personal computer communicably coupled to the apparatus body. The recording material S includes a sheet material such as paper, a plastic film, and cloth.

As shown in FIG. 1, the image forming units Pa, Pb, Pc, and Pd are disposed alongside inside the apparatus body along a moving direction (arrow R2 direction) of an intermediate transfer belt 13. The intermediate transfer belt 13 is stretched by a tension roller 14, a secondary transfer inner roller 15, and an idler roller 19, and rotatably driven in a rotation direction (arrow R2 direction) by a secondary transfer inner roller 15 driven by a motor, not shown. The intermediate transfer belt 13 bears and conveys the toner images primarily transferred from photosensitive drums 1*a*, 1*b*, 1*c*, and 1*d*.

A secondary transfer outer roller 25 is disposed in a position facing the secondary transfer inner roller 15 stretching the intermediate transfer belt 13 across the intermediate transfer belt 13, and forms a secondary transfer nip portion 12 for transferring the toner image on the intermediate transfer belt 13 onto the recording material S. The fixing unit 30 is disposed downstream of this pair of the secondary transfer inner and outer rollers 15 and 25 in a conveyance direction of the recording material S. To be noted, in a case of this embodiment, the image forming units Pa to Pd, primary transfer rollers 10*a* to 10*d*, the intermediate transfer belt 13, the tension roller 14, the secondary transfer inner roller 15, the idler roller 19, the secondary transfer outer roller 25, and the like construct an image forming unit 150 capable of forming the toner image on the recording material S.

A cassette 16 storing the recording material S is disposed in a lower part inside the apparatus body of the image forming apparatus 300. The recording material S stored in the cassette 16 is fed one sheet at a time from the cassette 16 by a conveyance roller 17 in accordance with a timing of image formation. The recording material S is conveyed to a registration roller 18, and, after the registration roller 18 has performed skew and timing corrections, the recording material S is sent to the secondary transfer nip portion T2.

The four image forming units Pa, Pb, Pc, and Pd included in the image forming apparatus 300 are substantially the same in configurations except tier a difference in a color of developer used in developing units 9*a*, 9*b*, 9*c*, and 9*d*. Accordingly, the image forming unit Pa of yellow will be described as a representative, and descriptions of the other image forming units Pb, Pc, and Pd will be omitted herein. The photosensitive drum 1*a* is disposed in the image forming unit Pa. The photosensitive drum 1*a* is rotatably driven in an arrow R1 direction. A charge roller 2*a*, an exposing unit 11*a*, the developing unit 9*a*, the primary transfer roller 10*a*, and a drum cleaner 3*a* are disposed around the photosensitive drum 1*a*.

In a case Where an image forming operation is started, at first, a surface of the photosensitive drum 1*a* that rotates is uniformly charged by the charge roller 2*a* to which a voltage is applied by a charging power source 20*a*. Next, the photosensitive drum 1*a* is scanned and exposed with a laser beam irradiated from the exposing unit 11*a* (for example, a laser scanner). Thereby, an electrostatic latent image corresponding to the image signal is formed on the photosensitive drum 1*a*. The electrostatic latent image formed on the photosensitive drum 1*a* is developed into the toner image by a toner (developer) stored inside the developing unit 9*a*.

The toner image formed on the photosensitive drum 1*a* is primarily transferred to the intermediate transfer belt 13 at a primary transfer portion formed between the photosensitive drum 1*a* and the primary transfer roller 10*a* disposed across the intermediate transfer belt 13. At this time, a primary transfer voltage is applied to the primary transfer roller 10*a* by a primary transfer power source 22*a*. To be noted, a primary transfer residual toner slightly remaining on the photosensitive drum 1*a* after the primary transfer is collected from the photosensitive drum 1*a* by the drum cleaner 3*a*.

It is possible to form the toner images of respective four colors on the intermediate transfer belt 13 by performing the operation described above in sequence in the respective image forming units Pa to Pd of yellow, magenta, cyan, and black. Thereafter, in accordance with the timing of the formation of the toner image, the recording material S is conveyed one sheet at a time from the cassette 16 to the secondary transfer nip portion 12. Then, by applying a secondary transfer voltage to the secondary transfer outer roller 25 by a secondary transfer power source 26, the toner image formed on the intermediate transfer belt 13 is secondarily transferred onto the recording material S at a time when the recording material S passes through the secondary transfer nip portion T2. To be noted, a secondary transfer residual toner slightly remaining on the intermediate transfer belt 13 after the secondary transfer is collected from the intermediate transfer belt 13 by a belt cleaner 27.

The recording material S onto which the toner image has been transferred from the intermediate transfer belt 13 is conveyed to the fixing unit 30. The fixing unit 30 fixes the toner image on the recording material S by providing the recording material S with heat and pressure while nipping and conveying the recording material S. The fixing unit 30 of this embodiment will be described later. The recording material S on which the fixing unit 30 has fixed the toner image is discharged to a sheet discharge tray 41.

Fixing Unit

Figure 2:
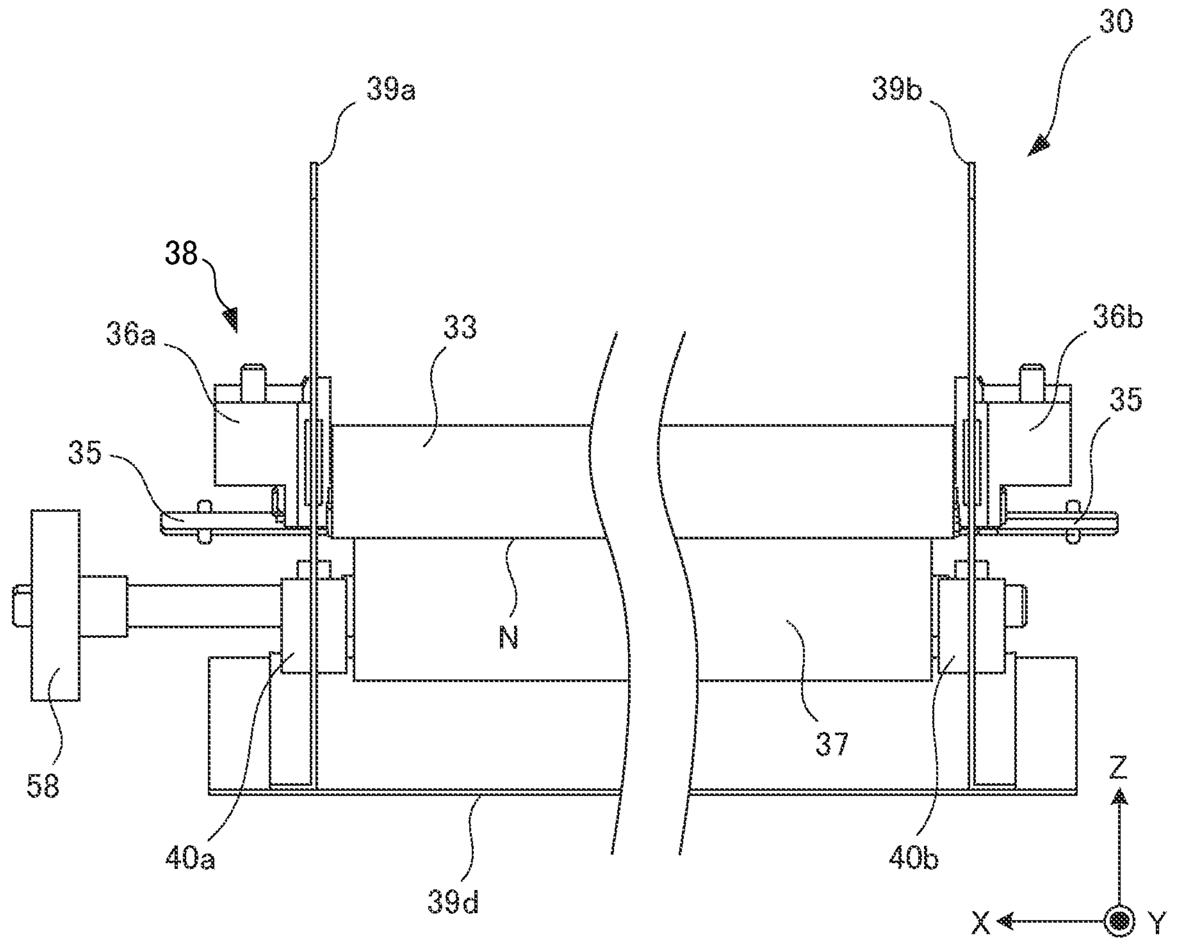
FIG. 2 is a front view showing a fixing unit.
Figure 3B:
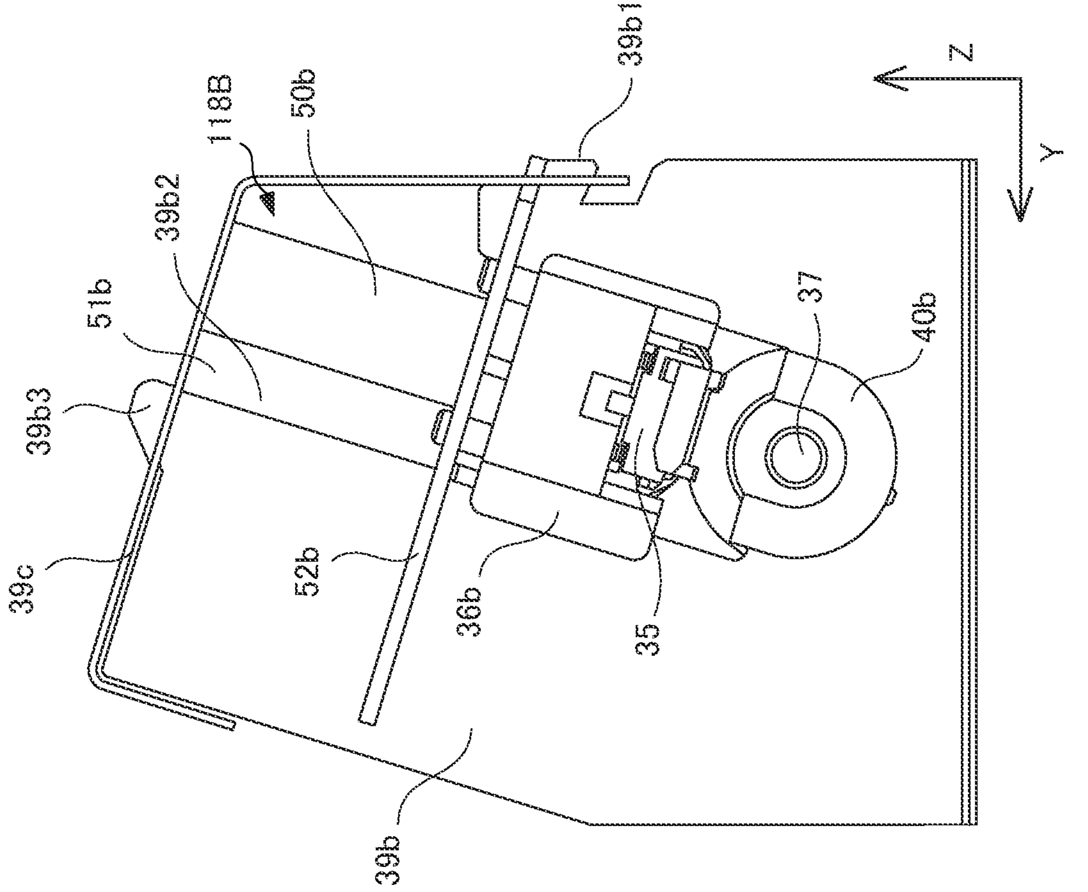
FIG. 3B is a right view showing the fixing unit.
Figure 3A:
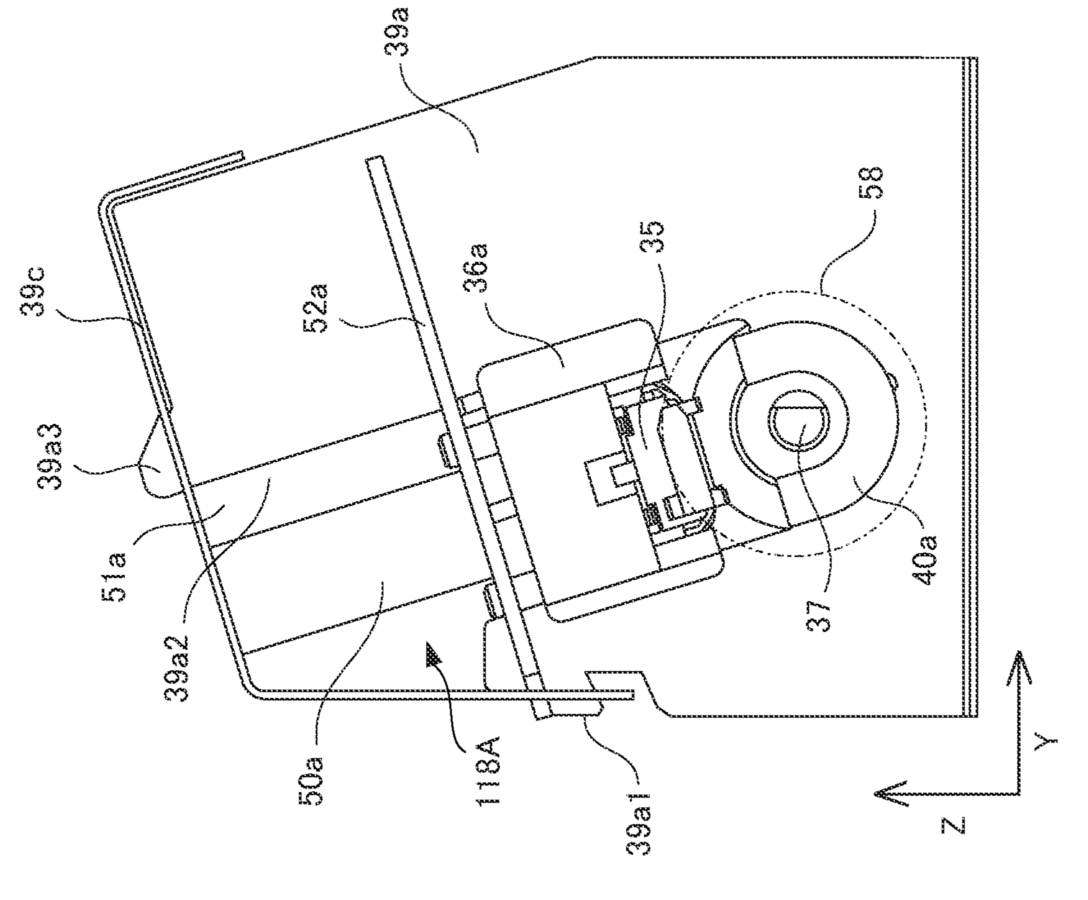
FIG. 3A is a left view showing the fixing unit.
Figure 4:
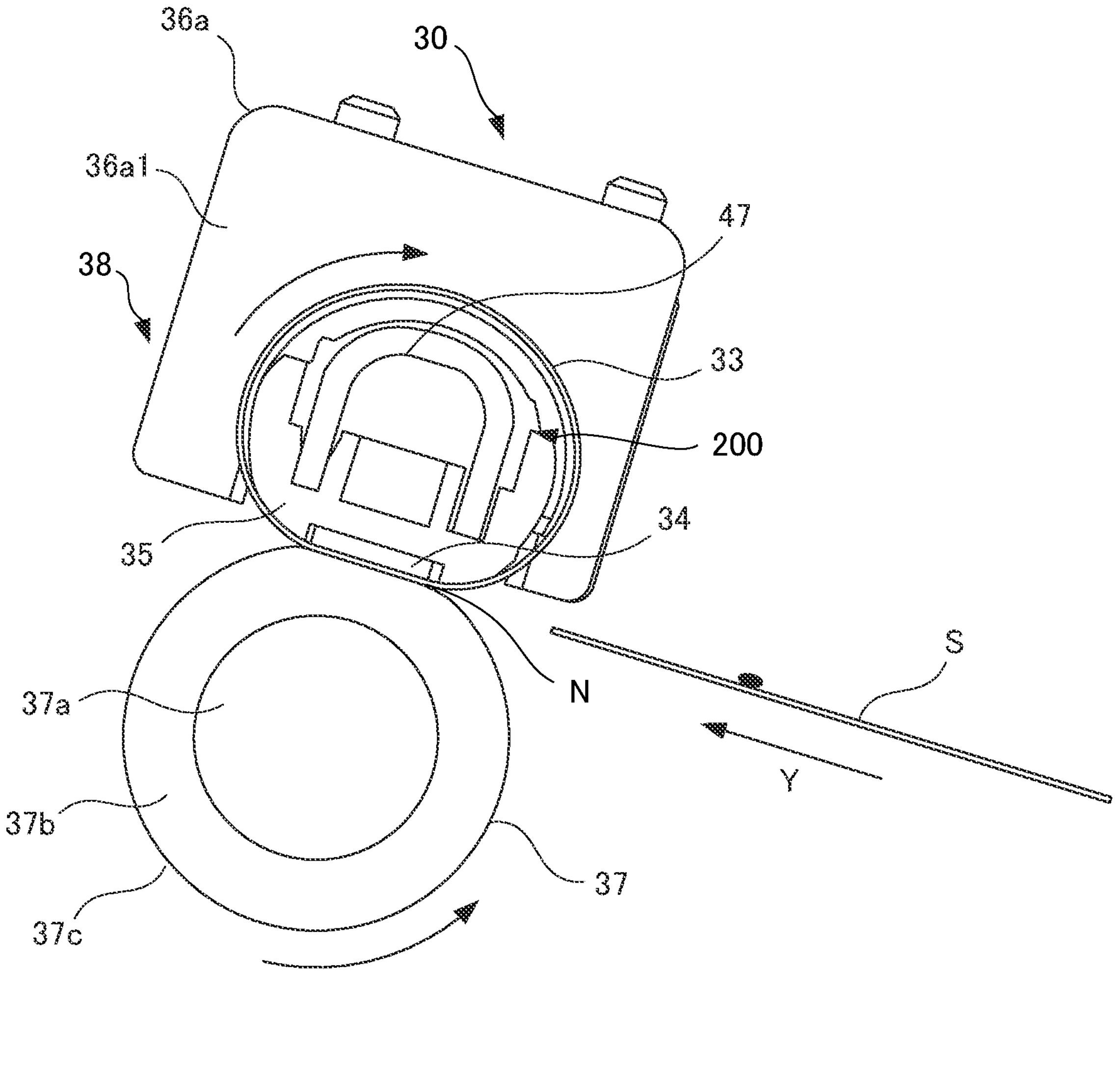
FIG. 4 is a cross-sectional view showing the fixing unit.
Figure 5:
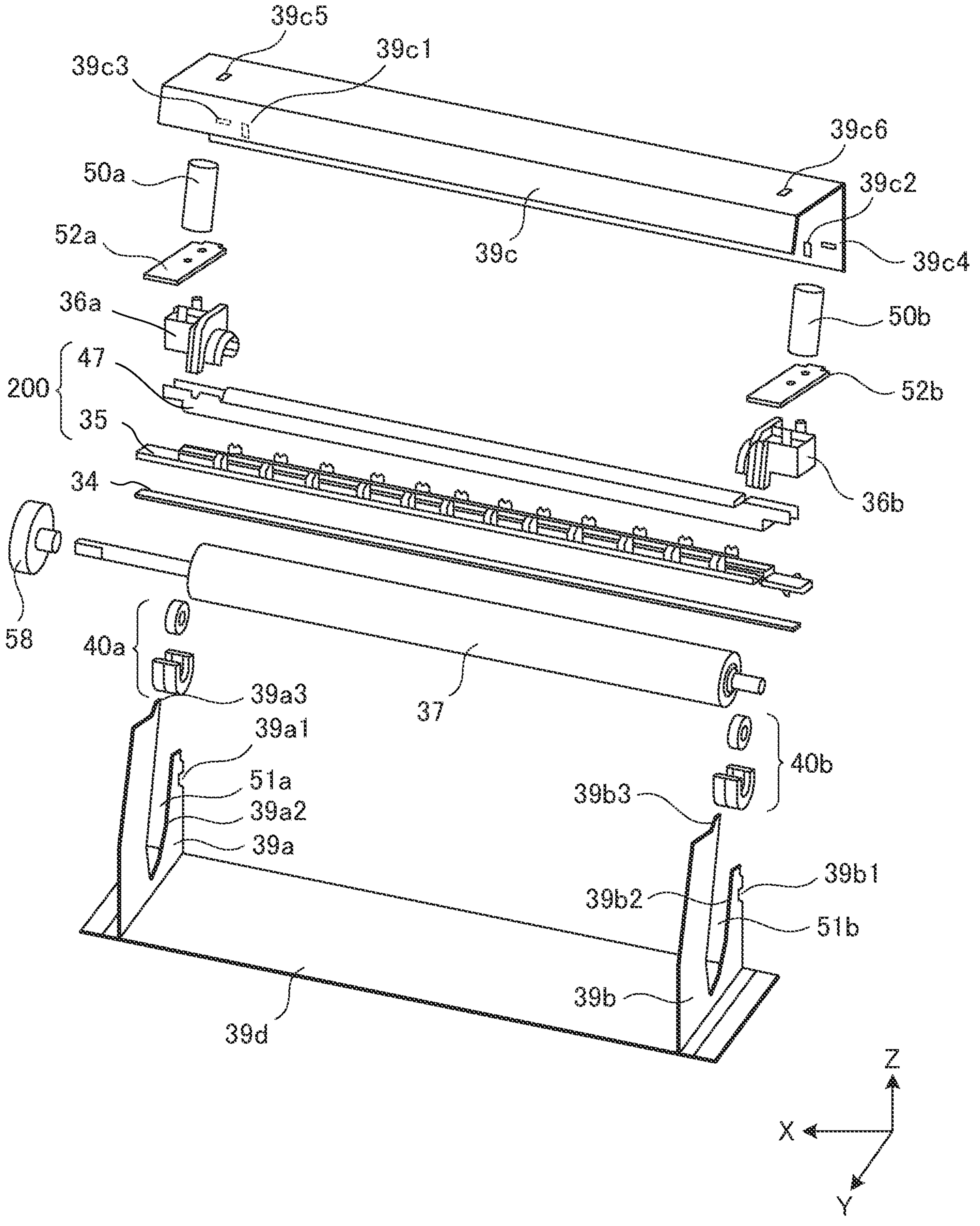
FIG. 5 is an exploded view showing the fixing unit.

Next, an outline of the fixing unit 30 of this embodiment will be described using FIGS. 2 to 5. FIG. 2 is a front view showing the fixing unit 30. FIGS. 3A and 3B are respectively left and right views showing the fixing unit 30. FIG. 4 is a cross-sectional view showing the fixing unit 30. FIG. 5 is an exploded view showing the fixing unit 30. However, an illustration of a fixing film 33 is omitted in FIG. 5.

To be noted, in the following descriptions, a side viewed in a case where the fixing unit 30 is viewed from a downstream side (a discharge side of the recording material S) in the conveyance direction (arrow Y direction) of the recording material S is referred to as "front", and a right side and a left side when viewed from the front side are respectively referred to as "right" and "left" (refer to FIG. 5). Further, a surface viewed in a case where a press roller 37 is viewed from a side of the fixing film 33 is referred to as "upper surface", and a surface viewed in a case where the fixing film 33 is viewed from a side of the press roller 37 is referred to as "lower surface". Further, unless otherwise explicitly noted, "upstream" and "downstream" respectively indicate upstream and downstream in the conveyance direction of the recording material S which passes through a fixing nip portion N. "Longitudinal direction (width direction)" indicates a direction intersecting with the conveyance direction (arrow Y direction) of the recording material S, in other words, a rotational axis direction of the press roller 37.

The fixing unit 30 of this embodiment adopts a film heating system. This fixing unit 30 is roughly divided into a film unit 38 including the fixing film 33, the press roller 37, pressing mechanisms (118A and 118B (refer to FIGS. 3A and 3B)), and a pair of side plates (39*a* and 39*b*). In the case of this embodiment, the first and second side plates 39*a* and 39*b* made of, for example, metal such as stainless steel (SUS) and aluminum (Al) or, for example, steel plate are installed uptight on sides of both ends of a bottom plate 39*d* in a manner facing each other in the longitudinal direction. The film unit 38 and the press roller 37 are supported by these first and second side plates 39*a* and 39*b*.

Press Roller

Both ends of a rotation shaft of the press roller 37, serving as a rotary member, in the longitudinal direction are rotatably supported by bearings 40*a* and 40*b*, and the bearings 40*a* and 40*b* are respectively held by the first and second side plates 39*a* and 39*b*. As shown in FIG. 4, the press roller 37 includes a core metal 37*a* (rotation shaft) and a pressing portion. The pressing portion is formed by an elastic layer 37*b* disposed around the core metal 37*a* and a release layer 37*c* disposed around the elastic layer 37*b*. For example, steel is used for the core metal 37*a*, and the elastic layer 37*b* is formed of silicone rubber. Further, the release layer 37*c* is mainly formed of tetrafluoroethylene-perfluoro (alkyl vinyl ether) copolymer (PFA). To be noted, the pressing portion is formed to have, for example, a length of 226 mm in the longitudinal direction and, for example, an outer diameter of 20 mm.

As shown in FIG. 2, the press roller 37 comes into contact with an outer circumferential surface of the fixing film 33, and forms the fixing nip portion N applying the heat while nipping and conveying the recording material S. The press roller 37 is rotatably driven by a drive gear 58 transmitting a driving force of a motor, not shown. A rotation force of the press roller 37 is transmitted to the fixing film 33 by a friction force which is generated in the fixing nip portion N along with the rotation of the press roller 37. Thus, the tubular fixing film 33 is rotatably driven by the press roller 37. The recording material S onto which the image forming unit 150 (refer to FIG. 1) has formed the toner image is nipped and conveyed while being pressed by the fixing nip portion N formed by the press roller 37 and the fixing film 33 that rotates.

When the fixing film 33 is rotatably driven along with a rotary drive of the press roller 37, the fixing film 33 is heated by a heater 34 (refer to FIG. 4) disposed in an inner space of the fixing film 33. The recording material S onto which the image forming unit 150 (refer to FIG. 1) has formed the toner image is conveyed to the fixing nip portion N, for example, in a state where a temperature of the heater 34 has been adjusted to a predetermined target temperature. To be noted, it is possible to appropriately set the temperature of the heater 34 corresponding to image forming conditions and the like, and not necessary to be determined beforehand. Then, when the recording material S is nipped and conveyed at the fixing nip portion N, the heat is applied to the recording material S via the fixing film 33 heated by the heater 34, and the toner image is fixed on the recording material S.

Film Unit

Next, the film unit 38 will be described. The film unit 38 includes the tubular fixing film 33, a holding unit 200, and flanges (36*a* and 36*b*) supporting the holding unit 200. As shown in FIGS. 4 and 5, the holding unit 200 includes a heater holder 35 holding the heater 34 and a stay 47, serving as a stay member, supporting the heater holder 35. In the case of this embodiment, the holding unit 200 is, as described later, supported by the flanges (36*a* and 36*b*) (refer to FIG. 2) via the stay 47. To be noted, the holding unit 200 is non-rotatably disposed on an inner circumferential side of the fixing film 33.

Fixing Film

The fixing film 33 is a thin heat-resistant film having flexibility formed in an endless (tubular) shape. The fixing film 33 is composed of three layers, namely a base layer, an elastic layer, and a surface layer. In this embodiment, for example, polyimide is used for the base layer. The elastic layer made of silicone rubber and the release layer made of PFA are formed on the base layer. The fixing film 33 is formed to have, for example, an inner diameter of 18 mm and an outer circumferential length of approximately 58 mm. Further, a length of the fixing film 33 in the longitudinal direction is, for example, 233 mm. So as to reduce a friction force generated between the heater holder 35 and the heater 34 coming into contact with the fixing film 33 from the inner circumferential side, grease is coated on the inner circumferential surface of the fixing film 33 as lubricant. In the case of this embodiment, as described later, so as to regulate a movement of the fixing film 33 in the longitudinal direction, the fixing film 33 is rotatably fitted with the flanges (36*a* and 36*b*) from the outside.

Heater

The heater 34 heating the fixing film 33 is, for example, a ceramic heater. The heater 34 heats the fixing film 33 by coming into contact with the inner circumferential surface of the fixing film 33 that rotates. Thereby, since the heat of the heater 34 is conducted to the recording material S via the fixing film 33, the toner image is melted by the heat and fixed on the recording material S when the recording material S passes through the fixing nip portion N.

The heater 34 is shown in FIG. 5. It is possible to call the Y axis direction that is the conveyance direction of the recording material S also as a short direction of the heater 34. It is possible to call an X axis direction orthogonally intersecting with the Y axis direction also as the longitudinal direction of the heater 34. It is possible to call a Z axis direction orthogonally intersecting with the Y axis direction also as a thickness direction of the heater 34.

The heater 34 includes a substrate elongated in the longitudinal direction as shown in FIG. 5, a healing resistor, not shown, disposed along the substrate in the longitudinal direction, and a protective member, not shown, covering the heating resistor. The heater 34 generates the heat by energizing the heating resistor. As the substrate, for example, alumina ($Al_2O_3$) that is ceramic is used. While a ceramic substrate includes a substrate of aluminum nitrate (AlN), zirconia (ZrO2), silicon carbide (SiC), or the like other than alumina, the ceramic substrate of alumina is inexpensive in price and industrially easily available. Alternatively, it is acceptable to use a metal substrate that has excellent strength as the substrate. As a metal substrate, for example, a substrate of stainless steel (SUS) is preferred since it is excellent in price and also in strength. In either case using the ceramic substrate or the metal substrate, an insulating layer is disposed in a case where the substrate has electrical conductivity. The protective member is, for example, glass and the like. To be noted, a length of the heating resistor in the longitudinal direction is shorter than a length of the fixing film 33 in the longitudinal direction, and, for example, 222 mm.

Pressing Mechanism

The first and second side plates 39*a* and 39*b* are movably disposed at both ends of the film unit 38 described above in the longitudinal direction, and movable toward a side of the press roller 37 by the pressing mechanisms (118A and 118B). The pressing mechanisms (118A and 118B), serving as pressing units, are constructed with the same structure as shown in FIGS. 3A and 3B, and respectively disposed on the first and second side plates 39*a* and 39*b*.

The pressing mechanism 118A (118B) includes a press plate 52*a* (52*b*) and a press spring 50*a* (50*b*). The press plate 52*a* (52*b*) is disposed in a manner capable of swinging with respect to the first side plate 39*a* (39B) around a first end of the press plate 52*a* (52*b*) as a swing center. The press plate 52*a* (52*b*) extends in the conveyance direction of the recording material S (the arrow Y direction) so as to come into contact with the flange 36*a* (36*b*). The press spring 50*a* (50*b*) urges the press plate 52*a* (52*b*) toward a pressing direction (opposite to the arrow Z direction) in a state where the press plate 52*a* (52*b*) is brought into contact with the flange 36*a* (36*b*). In the case of this embodiment, one end of the press spring 50*a* (50*b*) is fitted to an upper frame 39*c* disposed in a manner bridging the first and second side plates 39*a* and 39*b*, and the other end is fitted to the press plate 52*a* (52*b*). The press spring 50*a* (50*b*) is, for example, a compression spring.

As shown in FIGS. 3A and 3B, guide grooves 51*a* and 51*b* are disposed in the first and second side plates 39*a* and 39*b*. Bearings 40*a* and 40*b* are mounted on and positioned in the guide grooves 51*a* and 51*b*, and both ends of the core metal 37*a* (refer to FIG. 4) of the press roller 37 are rotatably supported by these bearings 40*a* and 40*b*. The heater holder 35 is disposed above the core metal 37*a* via the flange 36*a* (36*b*) as described later.

The fixing film 33, the press roller 37 (in particular, the pressing portion), and the heating resistor of the heater 34 are disposed in a manner aligning the centers in the longitudinal direction, and the recording material S is conveyed by positioning a center of the recording material S the middle (so-called center-referenced conveyance). Accordingly, in this embodiment, the fixing film 33 and the press roller 37 exist to the outside of both ends of the heating resistor of the heater 34 in the longitudinal direction. Further, as shown in FIG. 2, a length of the heater holder 35 in the longitudinal direction is longer than a distance between the first and second side plates 39*a* and 39*b*. Thereby, a temperature rise at the ends of the fixing film 33 caused by a protrusion of the heating resistor from the recording material S is suppressed.

As described above, the first and second side plates 39*a* and 39*b* are disposed upright on both ends of the bottom plate 39*d* in a manner facing each other in the longitudinal direction, and fixed by the upper frame 39*c* at one ends opposite the bottom plate 39*d*. As shown in FIG. 5, a hole portion 39*c*1 of the upper frame 39*c* engages with a hook portion 39*a*1 of the first side plate 39*a*. A hole portion 39*c*2 of the upper frame 39*c* engages with a hook portion 39*b*1 of the second side plate 39*b*. A hole portion 39*c*5 of the upper frame 39*c* engages with a projecting portion 39*a*3 of the first side plate 39*a*. A hole portion 39*c*6 of the upper frame 39*c* engages with a projecting portion 39*b*3 of the second side plate 39*b*.

In a case of assembling the fixing unit 30, members are respectively fitted to the guide groove 51*a* of the first side plate 39*a* and the guide groove 51*b* of the second side plate 39*b* in the order described below First members are the bearings 40*a* and 40*b* supporting the press roller 37, a second member is the heater holder 35 holding the heater 34, a third member is the stay 47, and fourth members are the flanges 36*a* and 36*b*. Among these members, the bearings 40*a* and 40*b* and the flanges 36*a* and 36*b* respectively come into contact with an edge portion 39*a*2 of the first side plate 39*a* forming the guide groove 51*a* and an edge portion 39*b*2 of the second side plate 39*b* forming the guide groove 51*b*.

The flanges 36*a* and 36*b* are slidably fitted above the heater holder 35 along the guide groove 51*a* of the first side plate 39*a* and the guide groove 51*b* of the second side plate 39*b*. Then, the flanges (36*a* and 36*b*) are pressed in the pressing direction toward the press roller 37 by the press springs (50*a* and 50*b*) via the press plates (52*a* and 52*b*). One end of the press plate 52*a* is inserted into a hole portion 39*c*3 of the upper frame 39*c*. One end of the press plate 52*b* is inserted into a hole portion 39*c*4 of the upper frame 39*c*. That is, the press plates (52*a* and 52*b*) are fitted in a manner capable of swinging around the hole portions (39*c*3 and 39*c*4) as swing centers by the press springs (50*a* and 50*b*).

Flange

Next, the flange 36*a* (36*b*) will be described. The flange 36*a* (36*b*) is disposed so as to regulate a shape of the fixing film 33 in the longitudinal and circumferential directions in the film unit 38. A material of the flange 36*a* (36*b*) is heat-resistant resin, and liquid crystal polymer (LCP) is used in this embodiment.

Figure 6A:
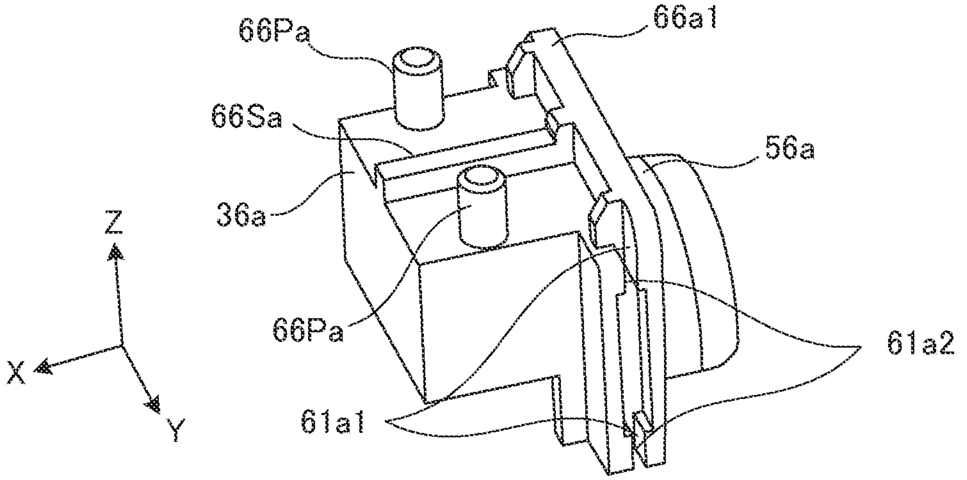
FIG. 6A is a perspective view showing a first flange when viewed from a front side.
Figure 6B:
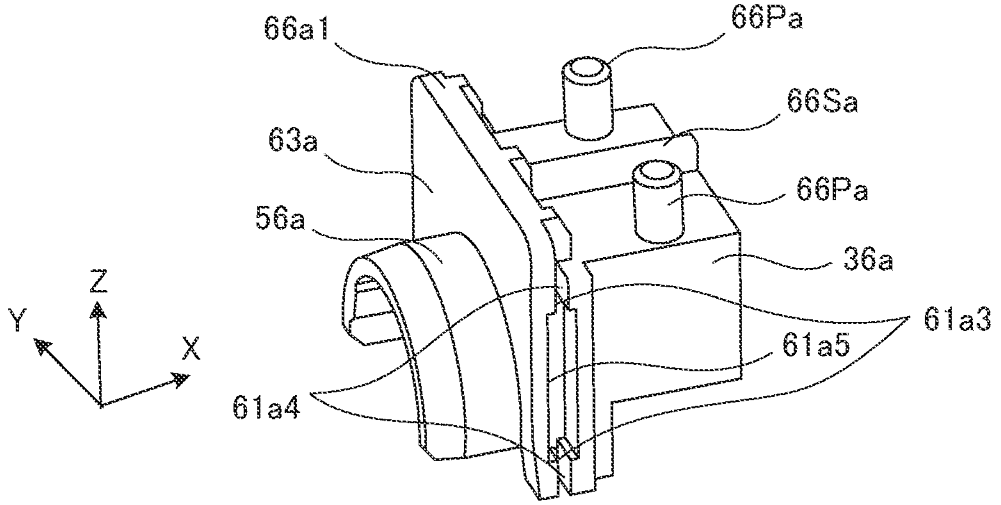
FIG. 6B is a perspective view showing the first flange when viewed from a side opposite the front side.
Figure 6C:
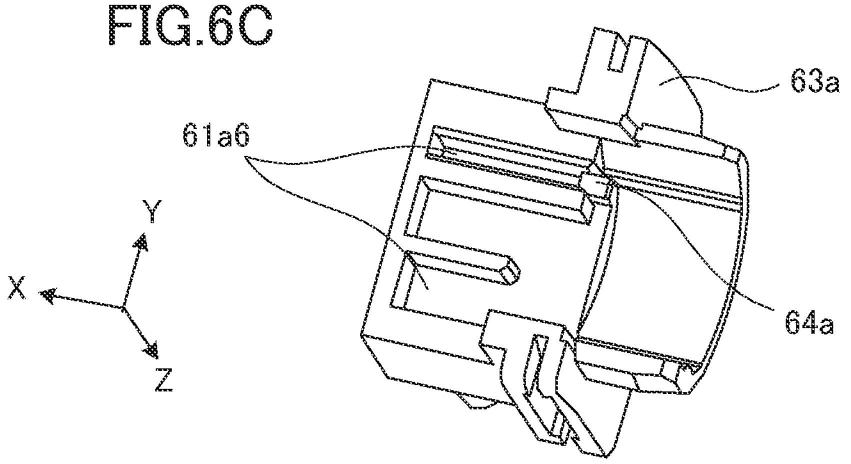
FIG. 6C is a perspective view showing the first flange when viewed from a lower surface side.

At first, the first flange 36*a* of the film unit 38 of this embodiment is shown in FIGS. 6A to 6C. FIG. 6A is a perspective view showing the first flange 36*a* on the left side when viewed from the front side (from the downstream side to the upstream side), FIG. 6B is a perspective view showing the first flange 36*a* when viewed from an opposite side of the front side (from the upstream side to the downstream side), and FIG. 6C is a perspective view showing the first flange 36*a* when viewed from the lower surface side.

The first flange 36*a*, serving as a first support member, includes an end portion regulation portion 66*a*1, an inner circumference regulation portion 56*a*, and a pressed portion 66Sa, and rotatably supports one end (first end) of the fixing film 33. The end portion regulation portion 66*a*1 includes a first regulation surface 63*a* coining into contact with one end face (edge surface) of the fixing film 33 that rotates, and regulates a movement of the fixing film 33 to a first direction (the arrow X direction) parallel to the longitudinal direction (called as skew regulation and the like). The inner circumference regulation portion 56*a* guides the rotation of the fixing film 33 by supporting the fixing film 33 from the inside. The pressed portion 66Sa includes a projecting portion receiving an urging force by the pressing mechanism 118A (refer to FIG. 3A), and is disposed opposite the inner circumference regulation portion 56*a* across the end portion regulation portion 66*a*1. Further, a fitting portion 66Pa projecting so as to be fitted with the press plate 52*a* is formed on the upper surface side of the pressed portion 66Sa. Then, a fitting portion 61*a*6 to which the stay 47 is fitted is formed on the lower surface side of the pressed portion 66Sa. That is, in this embodiment, the fitting portion 61*a*6 becomes a first holding portion holding a first end of the stay 47. Therefore, by coining into contact with the stay 47, the pressed portion 66Sa transmits a pressing force received from the press spring 50*a* to the stay 47 via the press plate 52*a*.

In the case of this embodiment, a first positioning portion 64*a* including a first contact surface 64*b* and a second contact surface 64*c* is formed in the fitting portion 61*a*6 of the first flange 36*a*. The first positioning portion 64*a* will be described later (refer to FIG. 14).

Figure 7A:
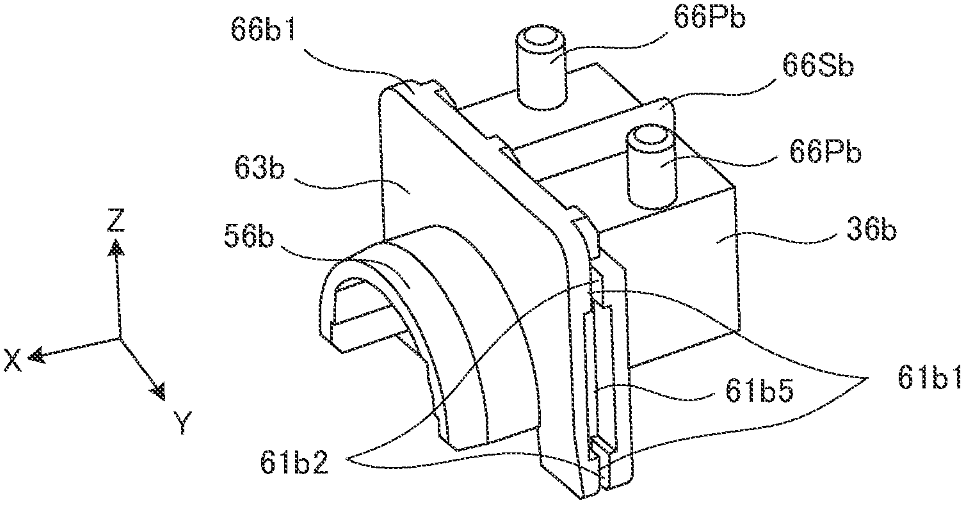
FIG. 7A is a perspective view showing a second flange when viewed from the front side.
Figure 7B:
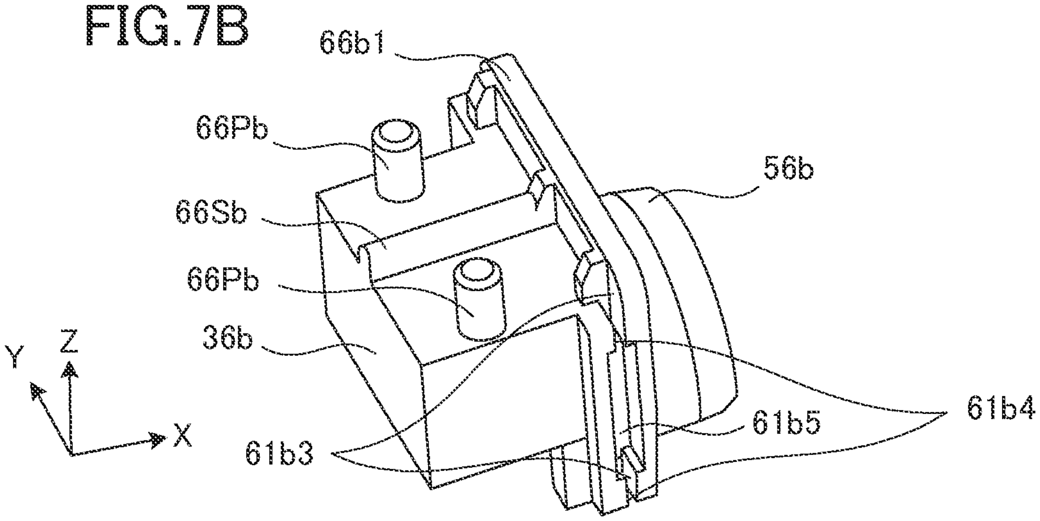
FIG. 7B is a perspective view showing the second flange when viewed from the side opposite the front side.
Figure 7C:
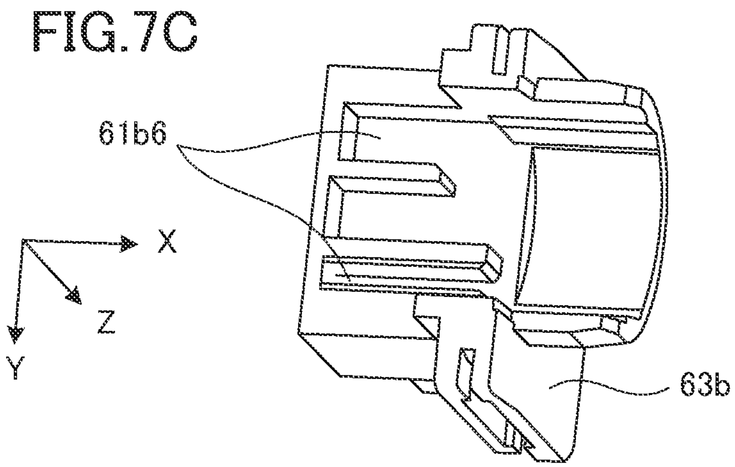
FIG. 7C is a perspective view showing the second flange when viewed from the lower surface side.

Next, the second flange 36*b* of the film unit 38 of this embodiment is shown in FIGS. 7A to 7C. FIG. 7A is a perspective view showing the second flange 36*a* on the right side when viewed from the front side (from the downstream side to the upstream side), FIG. 7B is a perspective view showing the second flange 36*b* when viewed from the opposite side of the front side (from the upstream side to the downstream side), and FIG. 7C is a perspective view showing the second flange 36*b* when viewed from the lower surface side.

The second flange 36*b*, serving as a second support member, includes an end portion regulation portion 66*b*1, an inner circumference regulation portion 56*b*, and a pressed portion 66Sb, and rotatably supports the other end (second end) of the fixing film 33. The end portion regulation portion 66*b*1 includes a second regulation surface 63*b* coming into contact with the other end face (edge surface) of the fixing film 33 that rotates, and regulates a movement of the fixing film 33 to a second direction opposite the first direction in the longitudinal direction. The inner circumference regulation portion 56*b* guides the rotation of the fixing film 33 by supporting the fixing film 33 from the inside. The pressed portion 66Sb includes a projecting portion receiving an urging force by the pressing mechanism 118B (refer to FIG. 3B), and is disposed opposite the inner circumference regulation portion 56*b* across the end portion regulation portion 66*b*1. Further, a fitting portion 66Pb projecting so as to be fitted with the press plate 52*b* is formed on the upper surface side of the pressed portion 66Sb. Then, a fitting portion 61*b*6 to which the stay 47 is fitted is formed on the lower surface side of the pressed portion 66Sb. That is, in this embodiment, the fitting portion 61*b*6 becomes a second holding portion holding a second end of the stay 47. Therefore, by coming into contact with the stay 47, the pressed portion 66Sb transmits a pressing force received from the press spring 50*b* to the stay 47 via the press plate 52*b*.

Heater Holder

Next, the heater holder 35 will be described using FIGS. 8 to 10. The heater holder 35 is disposed so as to guide the fixing film 33 while holding the heater 34 and so as to more securely form the fixing nip portion N with the press roller 37 via the fixing film 33. A material of the heater holder 35 is heat-resistant resin, and liquid crystal polymer (LCP) is used in this embodiment.

Figure 8:
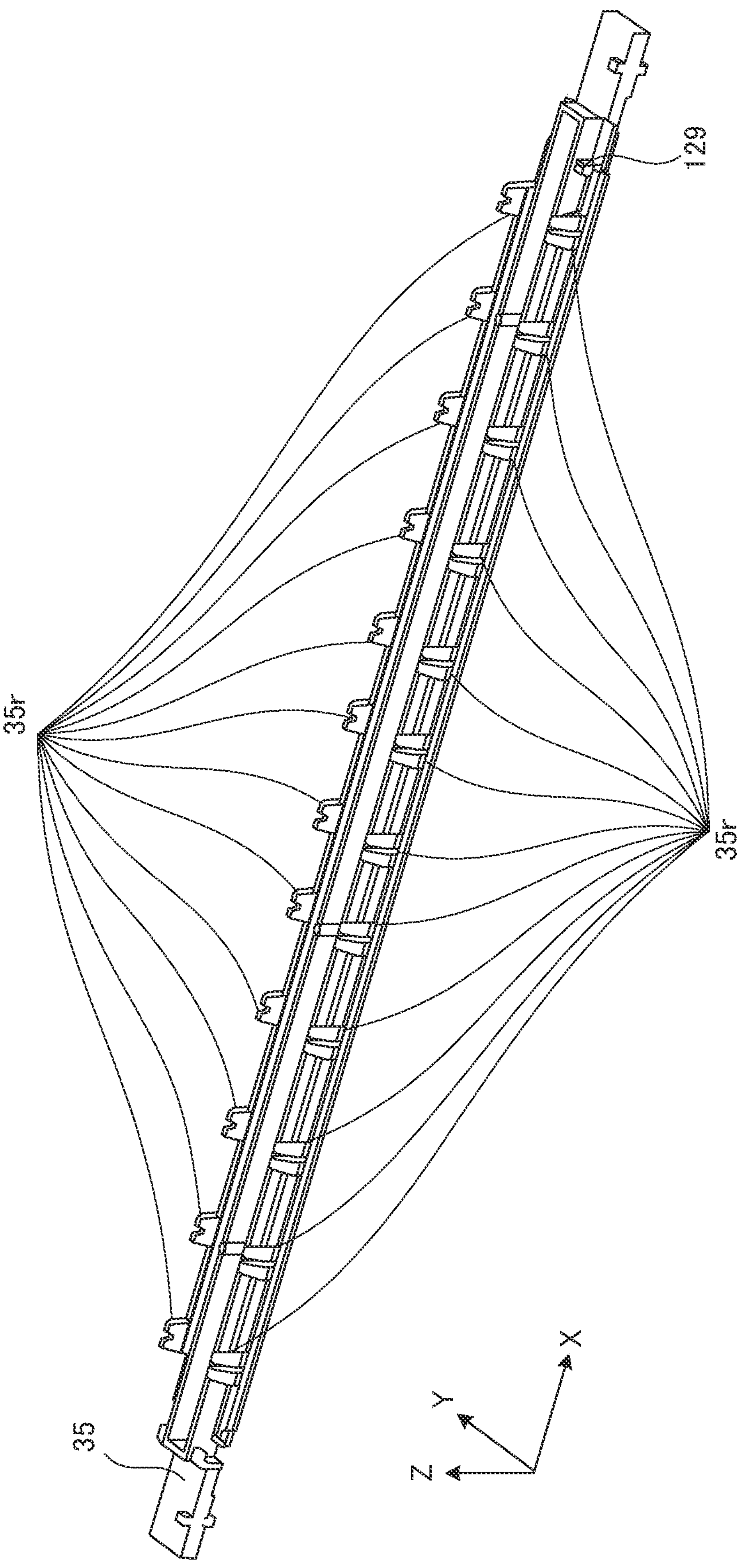
FIG. 8 is a perspective view showing a heater holder when viewed from an upper surface side.

FIG. 8 is a perspective view showing the heater holder 35 when viewed from the upper surface side (side of the stay 47). As shown in FIG. 8, a plurality of ribs 35*r* guiding the fixing film 33 by coming into contact with the inner circumference of the fixing film 33 that rotates are formed on both the upstream and downstream sides over the longitudinal direction of the heater holder 35, Further, in the case of this embodiment, the heater holder 35 includes a fourth positioning portion 129 positioning the heater holder 35 with respect to the stay 47 in the longitudinal direction. The fourth positioning portion 129 will be described later (refer to FIG. 15).

Figure 9:
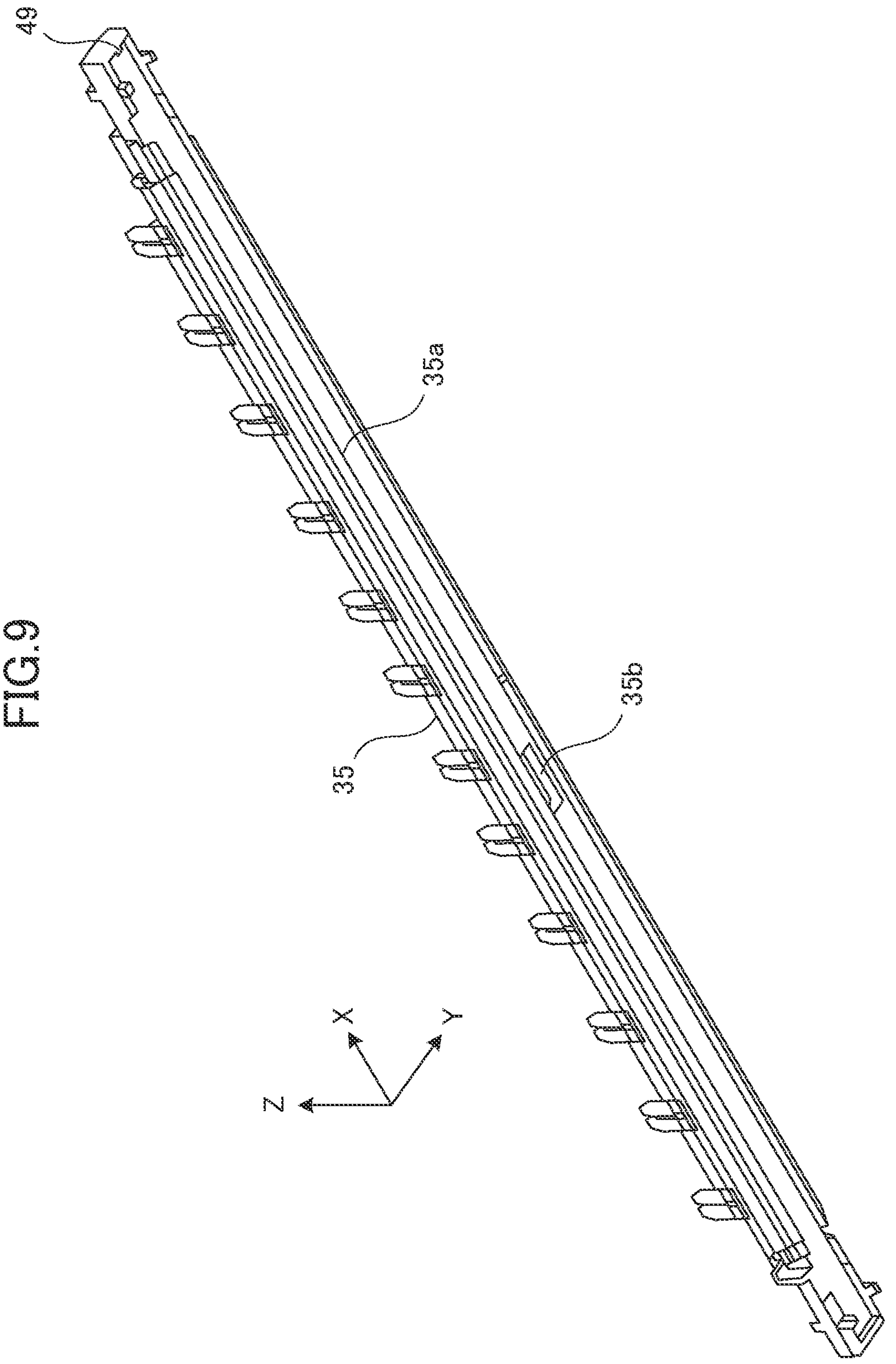
FIG. 9 is a perspective view showing the heater holder when viewed from the lower surface side.

FIG. 9 is a perspective view showing the heater holder 35 when viewed from the lower surface side (side of the press roller 37). As shown in FIG. 9, a fitting concave portion 35*a* capable of holding the heater 34 by fitting to a surface, opposite a surface on the side of the stay 47 (side of the fixing nip portion N), of the heater 34 is formed in the heater holder 35 in a shape extending along the longitudinal direction. One end of the heater 34 in the longitudinal direction is fixed to the heater holder 35 by being abutted, in the fitting concave portion 35*a*, onto a convex shaped portion 49 formed on the side of the first side plate 39*a*. Further, an installation hole 35*b* is formed in the heater holder 35 adjacent to the center of the heater holder 35 in the longitudinal direction, and a temperature sensor, not shown, for detecting a temperature of the heater 34 is disposed in the installation hole 35*b*.

Figure 10:
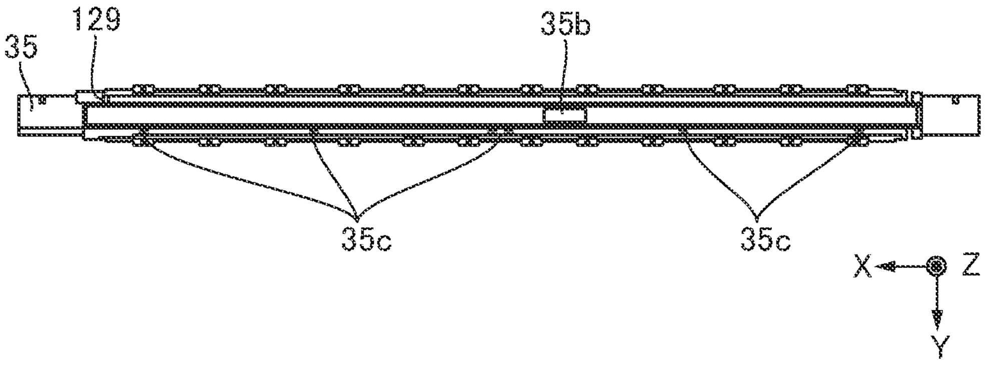
FIG. 10 is a top view showing the heater holder.

FIG. 10 is a top view showing the heater holder 35 when viewed from the side of the stay 47. As shown in FIG. 10, the heater holder 35 is positioned with respect to the stay 47 in the longitudinal direction by the fourth positioning portion 129 as described later. Locking portions 35*c* regulating a movement of the heater holder 35 with respect to the stay 47 so that the heater holder 35 does not swing around the fourth positioning portion 129 as an axis at that time are formed in the heater holder 35. The locking portions 35*c* are formed on the downstream side of the heater holder 35 and in positions coming into contact with the stay 47. The locking portions 35*c* are formed in a plurality of positions including positions adjacent to both ends in the longitudinal direction, and capable of holding the heater holder 35 in the stay 47 by reducing a deviation of a relative angle of the heater holder 35 with respect to the stay 47.

Deformation of the heater holder 35 described above is suppressed by the stay 47 such that the heater holder 35 does not deform into a bow shape in a state where the fixing film 33 and the press roller 37 come into contact with each other. The stay 47 is, for example, a stiffness member made of metal extending along the fixing film 33 in the longitudinal direction, and, as shown in FIG. 2, a cross section of the stay 47 is formed approximately in a U-shape having an opening on the side of the press roller 37.

Stay

Figure 11:
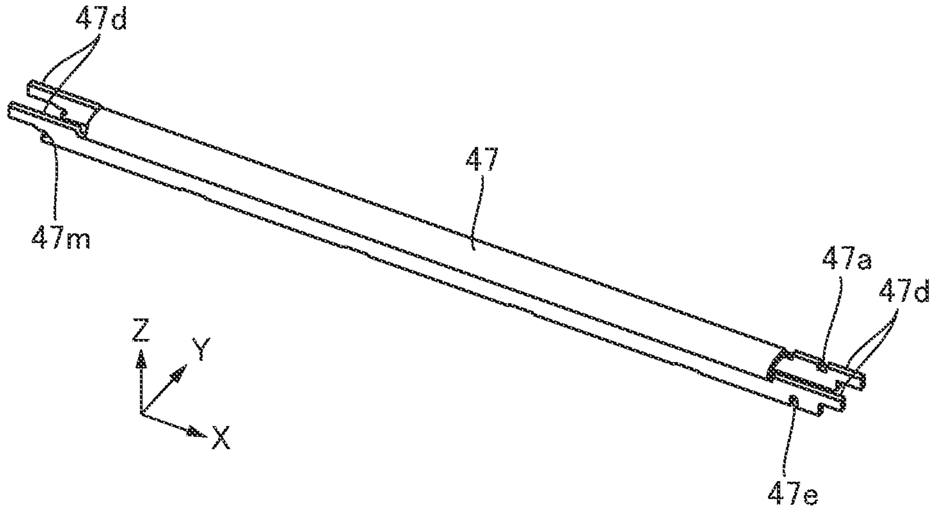
FIG. 11 is a perspective view showing a stay.

Using FIG. 11, the stay 47 will be described. FIG. 11 is a perspective view showing the stay 47. A material of the stay 47 is metal, and galvanized sheet iron is used in this embodiment. The stay 47 includes stay fitting portions 47*d* at both ends in the longitudinal direction, and the stay fitting portions 47*d* are respectively fitted to the fitting portion 61*a*6 of the first flange 36*a* (refer to FIG. 6C) and the fitting portion 61*b*6 of the second flange 36*b* (refer to FIG. 7C). Further, the stay 47 includes, on the side of the second flange 36*b*, a holder engagement portion 47*m* for engaging with the heater holder 35.

Further, in the case of this embodiment, the stay 47 includes a third positioning portion 47*e* including a third contact surface 47*f* and a fourth contact surface 47*g* (refer to FIG. 15 described later) on the side of the first flange 36*a*, and the third positioning portion 47_e_ is fitted to the fourth positioning portion 129 of the heater holder 35 (refer to FIG. 10). Further, the stay 47 includes a second positioning portion 47_a_ positioning the holding unit 200 with respect to the first flange 36_a_ in the longitudinal direction (refer to FIG. 14 described later) by being fitted to the first positioning portion 64_a_ (refer to FIG. 6C) of the first flange 36_a_.

In this embodiment, the flanges (36_a_ and 36_b_) are respectively disposed on the pair of side plates (39_a_ and 39_b_), and the position of the stay 47 in the longitudinal direction is determined using the first flange 36_a_ of the two flanges (36_a_ and 36_b_) as a reference. Further, a position of the heater holder 35 with respect to the stay 47 in the longitudinal direction is determined using the first flange 36_a_ as a reference. Further, a position of the heater 34 in the longitudinal direction is determined by the fitting concave portion 35_a_ (refer to FIG. 9) of the heater holder 35.

Side Plate and Flange

Figure 12:
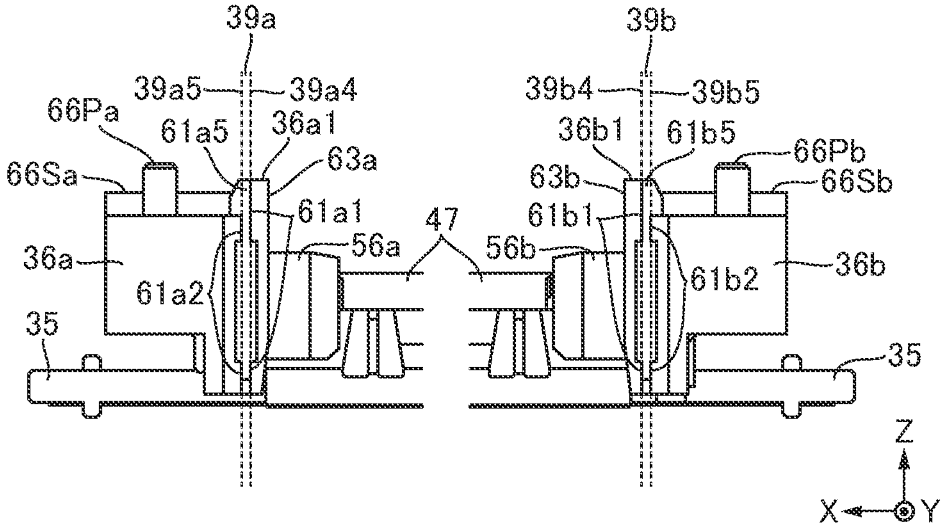
FIG. 12 is a front view showing a film unit of a first embodiment.
Figure 13:
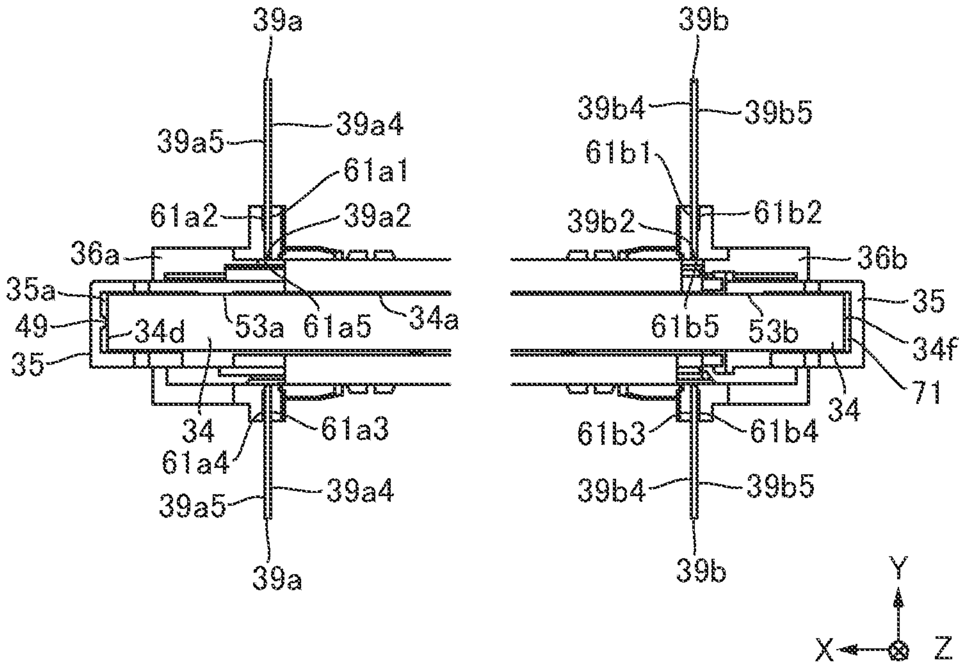
FIG. 13 is a bottom view showing the film unit of the first embodiment.

At first, referring to FIGS. 6A and 6B, a disposition of the first flange 36_a_ with respect to the first side plate 39_a_ will be described using FIGS. 12 and 13. FIG. 12 is a front view showing the film unit 38. FIG. 13 is a bottom view showing the film unit 38. To be noted, for facilitating the understanding of descriptions, an illustration of the fixing film 33 is omitted in FIGS. 12 and 13.

As described above, the first flange 36_a_ includes the end portion regulation portion 66_a_1. The end portion regulation portion 66_a_1 is formed in the first flange 36_a_ extending from the upstream side to the downstream side. As shown in FIG. 6A, clamp portions 61_a_1 and 61_a_2 are formed on the downstream side of the end portion regulation portion 66_a_1 in a manner facing each other in the longitudinal direction. Further, as shown in FIG. 6B, clamp portions 61_a_3 and 61_a_4 are formed on the upstream side of the end portion regulation portion 66_a_1 in a manner facing each other in the longitudinal direction.

Further, as shown in FIG. 13, in the longitudinal direction, the clamp portions 61_a_1 and 61_a_3 face an inside surface 39_a_4 of the first side plate 39_a_, and the clamp portions 61_a_2 and 61_a_4 face an outside surface 39_a_5 of the first side plate 39_a_. Thus, the first flange 36_a_ is disposed on the first side plate 39_a_. That is, as shown in FIG. 12, the first flange 36_a_ is disposed between the clamp portions 61_a_1 and 61_a_2 (and between the clamp portions 61_a_3 and 61_a_4) across the first side plate 39_a_.

Next, referring to FIGS. 7A and 7B, a disposition of the second flange 36_b_ with respect to the second side plate 39_b_ will be described using FIGS. 12 and 13. As described above, the second flange 36_b_ includes the end portion regulation portion 66_b_1. The end portion regulation portion 66_b_1 is formed in the second flange 36_b_ extending from the upstream side to the downstream side. As shown in FIG. 7A, clamp portions 61_b_1 and 61_b_2 are formed on the downstream side of the edge regulation portion 66_b_1 in a manner facing each other in the longitudinal direction. Further, as shown in FIG. 7B, clamp portions 61_b_3 and 61_b_4 are formed on the upstream side of the end portion regulation portion 66_b_1 in a manner facing each other in the longitudinal direction.

Further, as shown in FIG. 13, in the longitudinal direction, the clamp portions 61_b_1 and 61_b_3 face an inside surface 39_b_4 of the second side plate 39_h_, and the clamp portions 61_b_2 and 61_b_4 face an outside surface 39_b_5 of the second side plate 39_b_. Thus, the second flange 36_b_ is disposed on the second side plate 39_b_. That is, as shown in FIG. 12, the second flange 36_b_ is disposed between the clamp portions 61_b_1 and 61_b_2 (and between the clamp portions 61_b_3 and 61_b_4) across the second side plate 39_b_.

Flange and Stay

Figure 14:
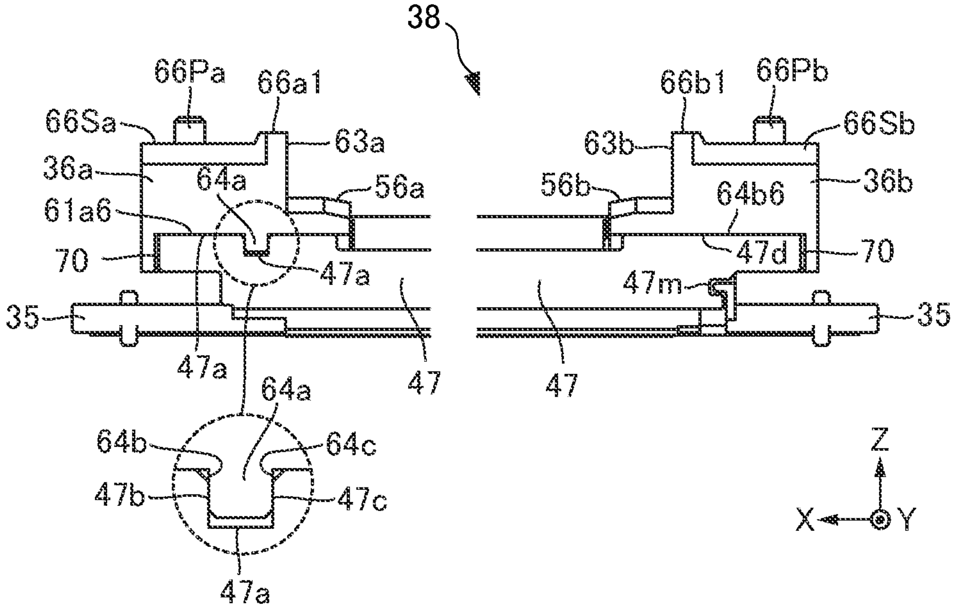
FIG. 14 is a diagram for describing a positioning configuration of the stay.

Next, a disposition of the stay 47 with respect to the flanges (36_a_ and 36_b_) will be described using FIG. 14. FIG. 14 is a diagram for describing a positioning configuration of the stay 47, and a cross-sectional view of the film unit 38 in a plane including the first and second positioning portions 64_a_ and 47_a_ described later.

In this embodiment, in the longitudinal direction, the stay 47 is positioned with respect to the first flange 36_a_ which is one of the two flanges (36_a_ and 36_b_). The stay 47 is positioned with respect to the first flange 36_a_ by fitting the first positioning portion 64_a_ formed in the first flange 36_a_ and the second positioning portion 47_a_ formed in the stay 47 to each other. The first positioning portion 64_a_ fits to the second positioning portion 47_a_ in a position closer to a center side than the end of the stay 47 in the longitudinal direction, and regulates a movement of the stay 47 to the longitudinal direction.

The first positioning portion 64_a_ includes the first and second contact surfaces 64_b_ and 64_c_. The second positioning portion 47_a_ includes a first contact surface 47_b_ capable of coming into contact with the first contact surface 64_b_ in a manner facing the first contact surface 64_b_ in the second direction (opposite direction of the arrow X direction) in a state fitted to the first positioning portions 64_a_, and the second contact surface 47_c_ capable of coming into contact with the second contact surface 64_c_ in a manner facing the second contact surface 64_c_ of the first positioning portion 64_a_ in the first direction (arrow X direction) in the state fitted to the first positioning portion 64_a_. In the case of this embodiment, since, in the state where the first and second positioning portions 64_a_ and 47_a_ are fitted to each other, either the first contact surface 64_b_ and the first contact surface 47_b_ or the second contact surface 64_c_ and the second contact surface 47_c_ come into contact with each other, it is possible to regulate the movement of the stay 47 to the longitudinal direction. For example, the first positioning portion 64_a_ is formed in a convex shape projecting from the fitting portion 61_a_6 of the first flange 36_a_ to the direction intersecting with the conveyance direction and the longitudinal direction. The second positioning portion 47_a_ is formed in a concave shape fitting to the first positioning portion 64_a_ in the convex shape at a stay fitting portion 47_d_ (refer to FIG. 11). By fitting these first and second positioning portions 64_a_ and 47_a_ to each other the stay 47 is positioned with respect to the first flange 36_a_ in the longitudinal direction, and, furthermore, the heater 34 is positioned in the longitudinal direction.

On the other hand, in the case of this embodiment, the second flange 36_b_ does not include the first positioning portion 64_a_ described above, and the stay 36_b_ does not include the second positioning portion 47_a_ described above. This is for the purpose of making it difficult for the stay 47 to interfere with the flanges (36_a_ and 36_b_) in a case Where the stay 47 has been thermally expanded by the heat of the heater 34, Further, one end face and the other end face of the stay 47 respectively include gaps 70 with the flanges (36_a_ and 36_b_) in a state where the stay 47 is supported by the flanges (36_a_ and 36_b_). That is, the gap 70 exists between the first end of the stay 47 and the flange 36_a_, serving as the first support member, in the longitudinal direction, and the gap 70 exists between the second end of the stay 47 and the flange 36_b_, serving as the second support member, in the longitudinal direction. By disposing the gaps 70, the stay 47 does not interfere with the first and second flanges 36_a_ and 36*b* even if the stay 47 has been expanded in the longitudinal direction. It is not preferred to position the stay 47 with respect to both of the flanges (36*a* and 36*b*) since an expanded stay 47 is brought into a stretched state between the first and second side plates 39*a* and 39*b*. Therefore, a bend or the like of the stay 47 occurs.

In the case of this embodiment, the first and second positioning portions 64*a* and 47*a* are formed on the downstream side from the center of the stay 47 in the state where the stay 47 is supported by the flanges (36*a* and 36*b*). This is because the thermal expansion of the stay 47 easily occurs on the upstream side across the fixing nip portion N since a temperature on the upstream side where a temperature reduction due to the passage of the recording material S does not occur is higher than a temperature on the downstream side.

Stay and Heater Holder

Figure 15:
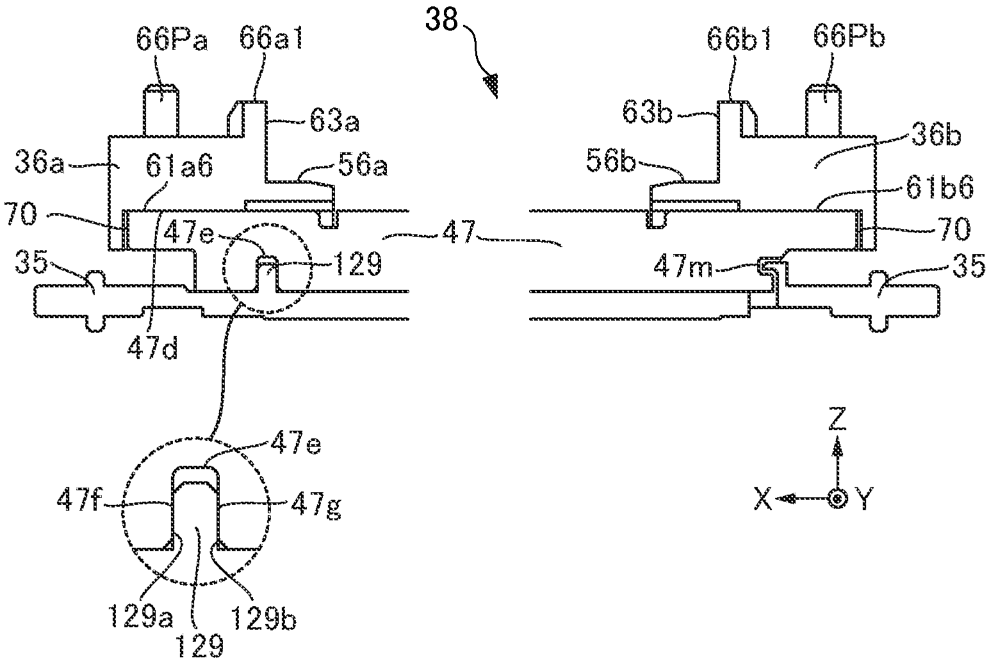
FIG. 15 is a diagram for describing a positioning configuration of the heater holder.

Next, a disposition of the stay 47 with respect to the heater holder 35 will be described using FIG. 15. FIG. 15 is a diagram for describing a positioning configuration of the heater holder 35, and a cross-sectional view of the film unit 38 in a plane including the third and fourth positioning portions 47*e* and 129 described later.

In this embodiment, the heater holder 35 is positioned with respect to the stay 47 in the longitudinal direction. The heater holder 35 is positioned with respect to the stay 47 by fitting the third positioning portion 47*e* formed in the stay 47 and the fourth positioning portion 129 formed in the heater holder 35 to each other. The third positioning portion 47*e* is formed on the side of the first flange 36*a* (the first support member side) from the center in the state where the stay 47 is supported by the flanges (36*a* and 36*b*).

The third positioning portion 47*e* includes the third and fourth contact surfaces 47*f* and 47*g*. The fourth positioning portion 129 includes a third touching surface 129*a* capable of coming into contact with the third contact surface 47*f* in a manner facing the third contact surface 47*f* in the second direction (opposite direction of the arrow X direction) in a state fitted to the third positioning portion 47*e*, and a fourth touching surface 129*b* capable of coming into contact with the fourth contact surface 47*g* in a manner facing the fourth contact surface 47*g* in the first direction (the arrow X direction) in the state fitted to the third positioning portion 47*e*. In the case of this embodiment, the fourth positioning portion 129 is formed in a convex shape projecting from the heater holder 35 to the direction intersecting with the conveyance direction and the longitudinal direction. The third positioning portion 47*e* is formed in a concave shape fitting to the fourth positioning portion 129 of the convex shape in the stay fitting portion 47*d* (refer to FIG. 11). By fitting these third and fourth positioning portions 47*e* and 129 to each other, the heater holder 35 is positioned with respect to the stay 47 in the longitudinal direction.

To be noted, from a viewpoint of strength, it is preferred that the third and fourth positioning portions 47*e* and 129 are formed at positions adjacent to but different from the first and second positioning portions 64*a* and 47*a* described above in the longitudinal direction and the conveyance direction of the recording material S. In the case of this embodiment, the third and fourth positioning portions 47*e* and 129 are formed on a central side of the stay 47 in comparison with the first and second positioning portions 64*a* and 47*a* and on the upstream side in the conveyance direction.

Heater Holder and Healer

Next, referring to FIGS. 9 and 13, a disposition of the heater 34 with respect to the heater holder 35 will be described. The fitting concave portion 35*a* is formed in the heater holder 35 as described above, and, as shown in FIG. 13, the fitting concave portion 35*a* includes, on the side of the first side plate 39*a*, a convex shape portion 49 projecting from a side to the inside in the longitudinal direction. The fitting concave portion 35*a* includes, on the downstream side, contact portions 53*a* and 53*b* coming into contact with the heater 34. Inside the fitting concave portion 35*a*, one end 34*d* of the heater 34 in the longitudinal direction is abutted onto the convex shape portion 49, and a side face 34*a* of the heater 34 on the downstream side is abutted onto the contact portions 53*a* and 53*b*. To be noted, the other end 34*f* of the heater 34 in the longitudinal direction is freed by not being abutted onto the heater holder 35, and includes a gap 71. The gap 71 is disposed so as to suppress impacts of component tolerances of the heater 34 and the heater holder 35, and the thermal expansion of the heater holder 35 by the heat of the heater 34.

Conventional Configuration

Figure 19:
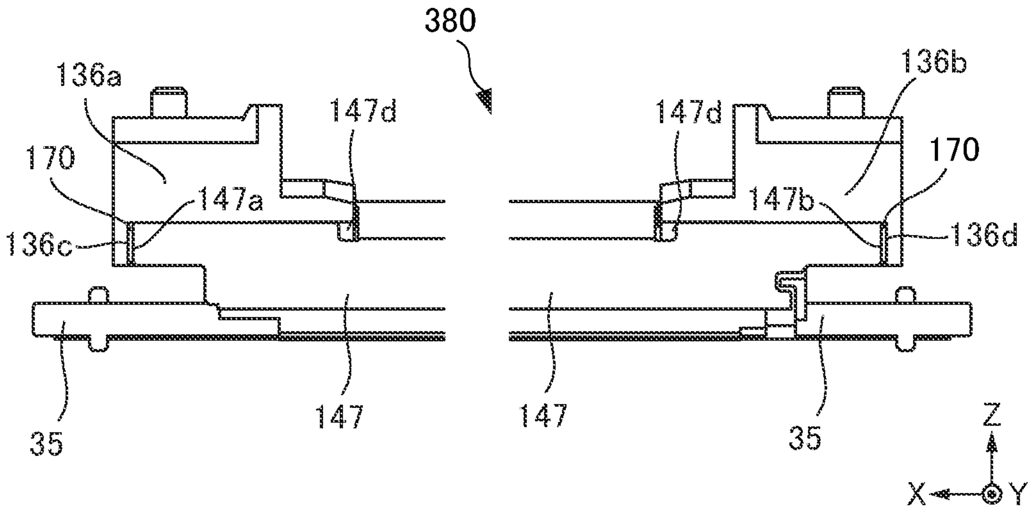
FIG. 19 is a front view showing a conventional example of the film unit.

At this point, for comparison, a conventional film unit 380 is shown in FIG. 19, FIG. 19 is a front view showing the conventional film unit 380. As understood from FIG. 19, a configuration for precisely positioning flanges (136*a* and 136*b*) and a stay 147 in the longitudinal direction is not adopted in the conventional film unit 380.

The flanges (136*a* and 136*b*) are respectively disposed on the first and second side plates 39*a* and 39*b*. Also in the conventional example, the flange 136*a* includes the fitting portion 61*a*6 (refer to FIG. 6C), and the flange 136*b* includes the fitting portion 61*b*6 (refer to FIG. 7C). Further, the stay 147 includes stay fitting portions 147*d* fitting to these fitting portions at both ends of the stay 147 in the longitudinal direction. However in the conventional example, the first positioning portion 64*a* described above is not formed in the flange 136*a*, and the second positioning portion 47*a* is not formed in the stay 147. Therefore, in a case of the conventional example, a position of the stay 147 in the longitudinal direction is approximately determined in such a manner that either one of both end faces (147*a* and 147*b*) of the stay fitting portions 147*d* is abutted onto facing surfaces (136*c* and 136*d*) of facing flanges (136*a* and 136*b*).

Taking into consideration the component tolerances of the stay 147 and the heater holder 35, and the thermal expansion caused by the heater 34, a distance between the facing surfaces (136*c* and 136*d*) of the flanges (136*a* and 136*b*) is larger than a length between both end faces (147*a* and 147*b*) of the stay fitting portions 147*d*. That is, a gap 170 is secured in either one or both of positions between the facing surface 136*c* and the end face 147*a* and between the facing surface 136*d* and the end face 147*b* so that the stay 147 is not stretched between the flanges (136*a* and 136*b*) in a case extended in the longitudinal direction by the thermal expansion. Therefore, a position of the heater 34 is not determined in the range of the gap. Since, in a case where, for example, the recording material S from an A4 size to a letter size is used, the length between the flanges (136*a* and 136*b*) becomes equal to more than 200 mm, a relatively large gap 170 is secured.

In comparison with this conventional example, as described above, in this embodiment, the stay 47 is positioned with respect to the first flange 36*a* in the longitudinal direction by the first positioning portion 64*a* formed in the first flange 36*a* and the second positioning portion 47*a* formed in the stay 47, Further, the heater holder 35 is positioned with respect to the stay 47 in the longitudinal direction by the third positioning portion 47*e* formed in the stay 47 and the fourth positioning portion 129 formed in the heater holder 35. Then, the impact of the thermal expansion of the stay 47 and the heater holder 35 is suppressed by disposing the gap 70 at least on the side of the second flange 36*b* opposite the side of the first flange 36*a* in which the first and second positioning portions 64*a* and 47*a* are formed. Since the positioning in the longitudinal direction is performed in sequence from the first side plate 39*a* to the flange 36*a*, the stay 47, and the heater holder 35 as described above, the positioning accuracy of the heater 34 is improved.

As described above, in this embodiment, the heater 34 is positioned in the longitudinal direction in sequence following the positioning configurations between the first flange 36*a* and the stay 47, between the stay 47 and the heater holder 35, and between the heater holder 35 and the heater 34. Thereby, it is possible to suppress a variation in the position of the heater 34 in the longitudinal direction, and improve the positional accuracy of the heater 34 in the longitudinal direction in comparison with the conventional configuration (refer to FIG. 19) in which the stay 147 is held loosely taking into consideration the thermal expansion.

Since it is possible to improve the positional accuracy of the heater 34 in the longitudinal direction by this embodiment, it is possible to reduce, in comparison with the conventional example, a temperature rise in a sheet no-passing portion due to a large protruding amount of the heating resistor of the heater 34 and a temperature reduction (temperature sagging) due to a small protruding amount of the heating resistor. Further, since an individual difference in the position of the heater 34 hardly occurs in the respective fixing units 30, it is possible to suppress an increase in power consumption.

To be noted, while, in the embodiment described above, the shape of the first and fourth positioning portions 64*a* and 129 and the shape of the second and third positioning portions 47*a* and 47*e* are respectively convex and concave, it is not limited to this. For example, it is acceptable to form the first and fourth positioning portions 64*a* and 129 in the concave shape and form the second and third positioning portions 47*a* and 47*e* in the convex shape. Any combination of shapes is acceptable if it is possible to fit the first and second positioning portions 64*a* and 47*a* and the third and fourth positioning portions 47*e* and 129 to each other.

Second Embodiment

Figure 17A:
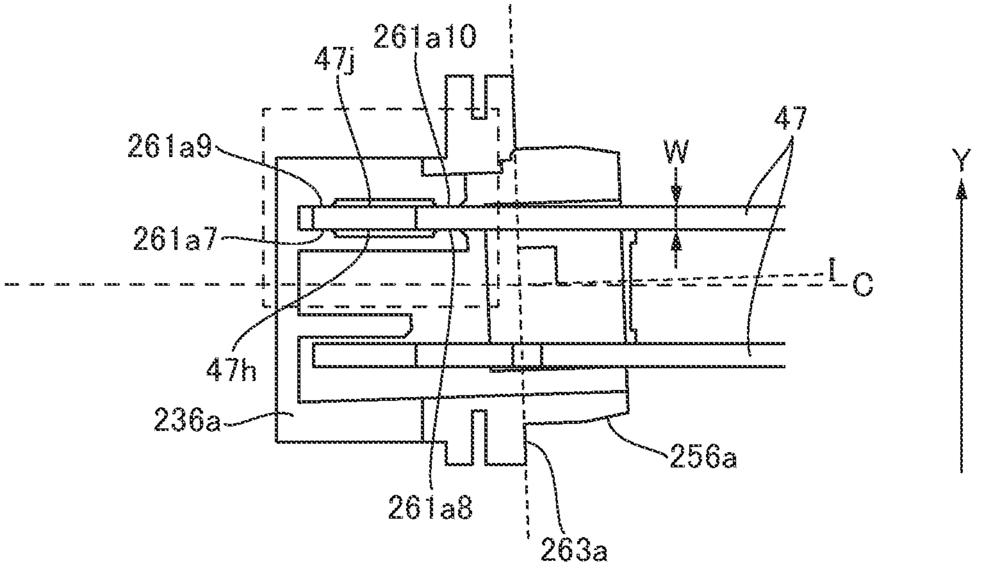
FIG. 17A is a bottom view showing a state where the stay and the flange are fitted to each other.
Figure 17B:
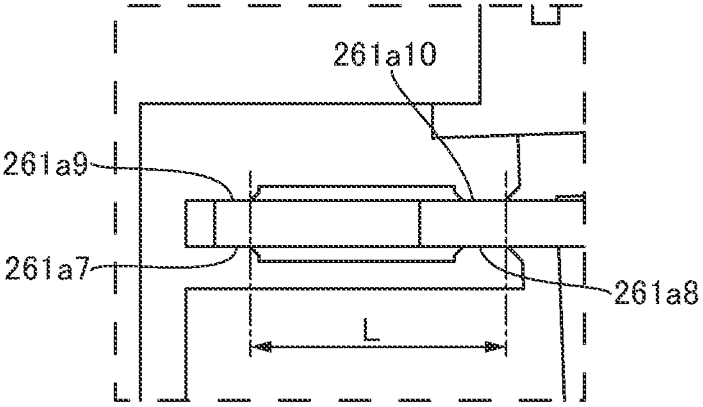
FIG. 17B is a partially enlarged view showing the state where the stay and the flange are fitted to each other.
Figure 18:
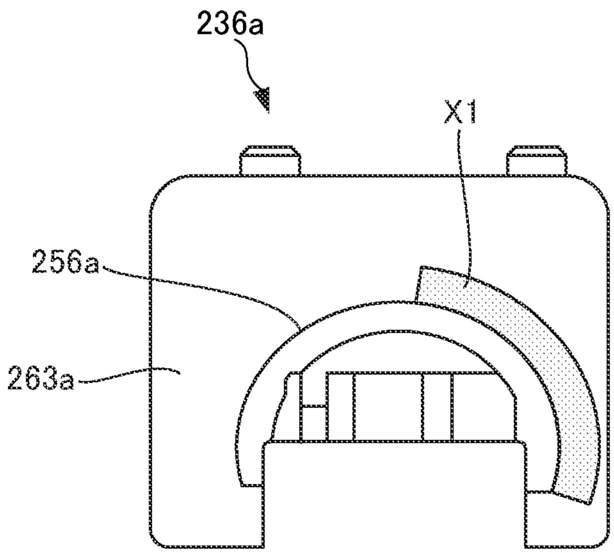
FIG. 18 is a diagram showing a support state of a fixing film on the flange.

Next, a film unit 38A of a second embodiment will be described using FIGS. 15 to 18. FIG. 15 is a top view showing the film unit 38A of the second embodiment. However for facilitating the understanding of descriptions, the illustration of the fixing film 33 is omitted in FIG. 16. FIG. 17A is a bottom view showing a state where the stay 47 and a first flange 236*a* are fitted to each other, and FIG. 17B is a partially exploded view FIG. 18 is a diagram showing the adhesion of the fixing film 33 to the first flange 236.

To be noted, in the film unit 38A of the second embodiment, configurations similar to the film unit 38 (refer to FIG. 2) of the first embodiment described above are put with the same reference characters, and descriptions will be simplified or omitted herein. Further, while descriptions will be omitted herein, it is acceptable to form the first, second, third, and fourth positioning portions 64*a*, 47*a*, 47*e*, and 129 in the film unit 38A of the second embodiment similar to the film unit 38 of the first embodiment.

Figure 16:
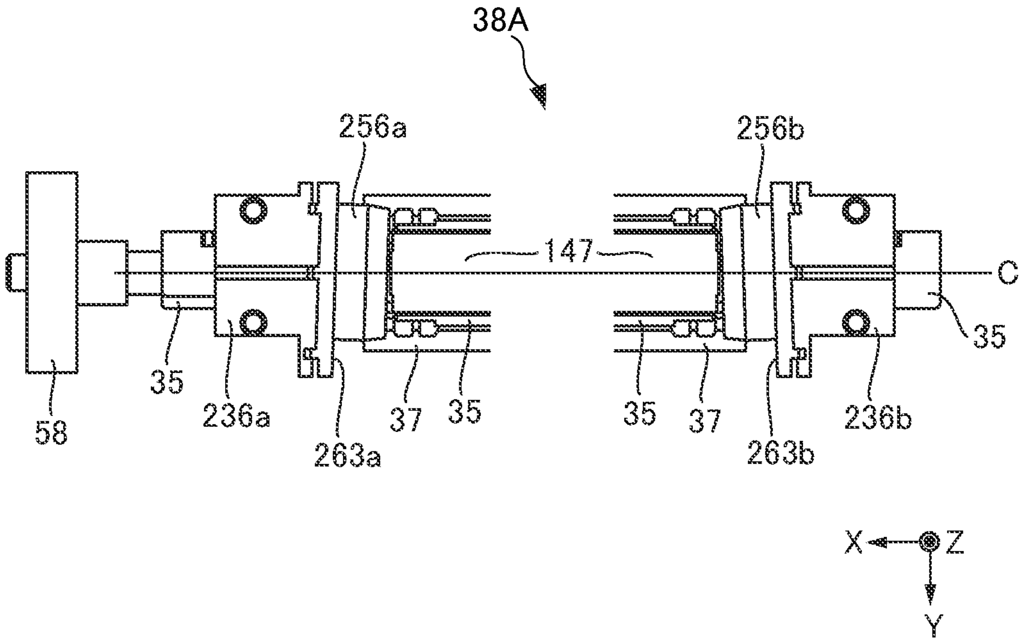
FIG. 16 is a top view showing a film unit of a second embodiment.

As shown in FIG. 16, in the film unit 38A of the second embodiment, unlike the first embodiment, across the fixing nip portion N, a distance between a first regulation surface 263*a* and a second regulation surface 263*b* respectively coming into contact with both end faces (edge surfaces) of the fixing film 33 that rotates is narrower on the upstream side than the distance on the downstream side. That is, in a state where flanges (236*a* and 236*b*) are fitted to the stay 47, when viewed from the upper surface, the first and second regulation surfaces 263*a* and 263*b* are formed in a manner inclining to the central side so that the distance between the first and second regulation surfaces 263*a* and 263*b* becomes narrower on the upstream side than the distance on the downstream side.

As shown in FIG. 17A, so as to regulate the inclination to the conveyance direction with reference to a center line C of the stay 47, touching portions 261*a*7, 261*a*8, 261*a*9, and 261*a*10 are formed in the first flange 236*a*. The touching portions 261*a*7 and 261*a*8 face the touching surface 47*h* of the stay 47 to which the touching portions 261*a*7 and 261*a*8 are fitted, and the touching portions 261*a*9 and 261*a*10 face the touching surface 47*j* of the stay 47 to which the touching portions 261*a*9 and 261*a*10 are fitted.

An angle between a straight line I orthogonally intersecting with the first regulation surface 263*a* of the first flange 236*a* and the center line C of the stay 47 is regulated within a range generated by component tolerances, that is, the range between a state where the touching portions 261*a*7 and 261*a*10 respectively come into contact with the touching surfaces 47*h* and 47*j* and a state where the touching portions 261*a*8 and 261*a*9 respectively come into contact with the touching surfaces 47*h* and 47*j*. Lengths between the touching portions 261*a*7 and 261*a*8 and between touching portions 261*a*9 and 261*a*10 in the longitudinal direction are the same L, and L is, for example, equal to 9 mm. Further, a distance between the touching portions 261*a*7 and 261*a*9, which are facing each other, and a distance between the touching portions 261*a*8 and 261*a*10, which are facing each other, are set at a width W at which the stay 47 is allowed to fit in almost exactly.

In a case of this embodiment, the stay 47 is held by the first flange 236*a* such that the straight line I orthogonally intersecting with the first regulation surface 263*a* of the first flange 236*a* and an extended line of an inner circumference regulation portion 256*a* are directed toward the downstream side with respect to the center line C of the stay 47. While an illustration is omitted, the second flange 236*b* on the other end in the longitudinal direction is also similar to the first flange 236*a* described above in a configuration. Thereby, when the stay 47 is fitted to the flanges (236*a* and 236*b*) as described above, the first and second regulation surfaces 263*a* and 263*b* incline toward the inside so that, when viewed from above, the distance between the first and second regulation surfaces 263*a* and 263*b* becomes narrower on the upstream side than the distance on the downstream side.

In this embodiment, the touching portions 261*a*7 and 261*a*8 and the touching portions 261*a*9 and 261*a*10 of the flanges (236*a* and 236*b*) come into contact with stay 47 in different positions in the longitudinal direction with a width L in between. Therefore, angles between the flanges (236*a* and 236*b*) and the stay 47 are accurately determined. Since inclinations are provided between the flanges (236*a* and 236*b*) and the stay 47, the inclinations are also provided between the heater holder 35 held by the stay 47 and the flanges (236*a* and 236*b*).

FIG. 18 is a diagram showing a support state of the fixing film 33 at the first flange 236*a* when viewed from the longitudinal direction. To be noted, while the first flange 236*a* will be described as an example here, the second flange 236*b* is the same.

As described above, in a case where the first regulation surface 263*a* is inclined toward the inside, the end of the fixing film 33 comes into contact with the first regulation surface 263*a* in an area corresponding to a gray-colored portion X1 shown in FIG. 18. At this point, on the upstream side of the fixing nip portion N, the fixing film 33 is rotatably driven by the press roller 37 in a manner taking a track of being drawn to the side of the inner circumference regulation portion 256*a*. Therefore, the fixing film 33 winds around the upstream side of the inner circumference regulation portion 256*a* of the first flange 236*a*, and becomes a regulated state on the upstream side of the first flange 236*a*. On the other hand, on the downstream side of the fixing nip portion N, the fixing film 33 does not adhere to the inner circumference regulation portion 256*a* of the first flange 236*a*, and is in a free-form. This is because, since the fixing film 33 is externally fitted to the inner circumference regulation portion 256*a* at the first flange 236*a*, an inner circumferential length of the fixing film 33 is longer than an outer circumferential length formed by the inner circumference regulation portion 256*a* and the heater holder 35.

As described above, in this embodiment, the flanges (236*a* and 236*b*) are inclined with respect to the stay 47 so as to shorten the distance between the regulation surfaces (263*a* and 263*b*) of the flanges (236*a* and 236*b*) of both sides on the upstream side of the fixing nip portion N. Then, the fixing film 33 is regulated by the regulation surfaces (263*a* and 263*b*) on the upstream side of the fixing nip portion N in a state adhering to the flanges (236*a* and 236*b*). Thereby, since, in comparison with the downstream side where the fixing film 33 does not adhere to the inner circumference regulation portions (256*a* and 256*b*) and is in the free-form, a certain curvature is given to the fixing film 33 by the regulation surfaces (263*a* and 263*b*) on the upstream side, the fixing film 33 becomes to be hardly deformed by a force in the longitudinal direction on the upstream side. Therefore, even in a case where a skew force which causes the end of the fixing film 33 to strongly abut onto the regulation surfaces (263*a* and 263*b*) is generated, it is possible to suppress a generation of breaking, buckling, wear, or the like in the fixing film 33.

Other Embodiment

To be noted, in the embodiments described above, the first positioning portion 64*a* is formed in the first flange 36*a*, and, with reference to this, the second, third, and fourth positioning portions 47*a*, 47*e*, and 129 are formed in the stay 47 or the heater holder 35. However, this is an example, and it is not limited to this. For example, it is acceptable to form the first positioning portion 64*a* in the second flange 36*b*, and, using this as a reference, acceptable to form the second, third, and fourth positioning portions 47*a*, 47*e*, and 129.

Further, while, in the embodiments described above, the heater holder 35 holding the heater 34 and the stay 47 supporting the heater holder 35 are described as the holding unit 200, this is an example, and it is not limited to this. For example, it is acceptable to integrally form the heater holder 35 with the stay 47 as one member, or construct the holding unit 200 with equal to or more than three members including the heater holder 35, the stay 47, and a member coupling the heater holder 35 and the stay 47 to each other. In a case where the holding unit 200 is constructed with equal to or more than three members, it is preferred to position the heater 34 in a manner regulating movements of the respective members in the longitudinal direction by being fitted with the first, second, third, fourth positioning portions 64*a*, 47*a*, 47*e*, 129, described above, and the like.

To be noted, the film unit 38 (38A) is not limited to a film unit in Which the heater 34 directly touches on and heats the fixing film 33, and it is acceptable that the heater 34 heats the fixing film 33 via a sheet material made of iron alloy, aluminum, or the like having high thermal conductivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-045687, filed Mar. 19, 2021, which is hereby incorporated by reference herein in its entirety.

What is claimed is:

1. A heating apparatus comprising:

a first side plate disposed on a first side of the heating apparatus;

a second side plate disposed on a second side of the heating apparatus and opposite to the first side plate;

a tubular film disposed between the first side plate and the second side plate;

a heater disposed in an inner space of the film;

a first flange including a first regulation surface configured to regulate a movement of the film toward the first side in a longitudinal direction of the heater, and configured to rotatably support the film, the first flange being positioned with respect to the first side plate;

a second flange including a second regulation surface configured to regulate a movement of the film toward the second side in the longitudinal direction, and configured to rotatably support the film, the second flange being positioned with respect to the second side plate;

a heater holder configured to hold the heater; and a stay member, made of metal, extending along the film in the longitudinal direction for suppressing deformation of the heater holder, wherein the stay member is regulated from moving in the longitudinal direction with respect to the first flange by fitting a convex portion provided on one side of the first flange and the stay member with a concave portion provided on the other of the first flange and the stay member, wherein the heater holder is regulated from moving in the longitudinal direction with respect to the stay member by fitting a convex portion provided on one of the heater holder and the stay member with a concave portion provided on the other of the heater holder and the stay member.

2. The heating apparatus according to claim 1, wherein, in a state where the stay member is supported by the first flange and the second flange, the convex portion provided on the one of the first flange and the stay member and the concave portion provided on the other of the first flange and the stay member are formed on a downstream side of a center of the stay member in a conveyance direction of a recording material.

3. The heating apparatus according to claim 1, further comprising a rotary member configured to come into contact with an outer circumferential surface of the film in a manner nipping the film with the heater, and configured to form a nip portion so as to provide heat to a recording material while nipping and conveying the recording material with the film, and wherein the heater is configured to heat the film and fix an image on the recording material by heating the image formed on the recording material at the nip portion via the film.

4. The heating apparatus according to claim 3, wherein a distance between the first regulation surface and the second regulation surface in the longitudinal direction on an upstream side across the nip portion in a conveyance direction of a recording material is narrower than a distance between the first regulation surface and the second regulation surface in the longitudinal direction on a downstream side across the nip portion in the conveyance direction of the recording material.

5. The heating apparatus according to claim 3, further comprising a press unit, wherein the first and second side plates are configured to movably support the first flange and the second flange to a press direction toward the rotary member, and wherein the press unit is configured to press the film to the rotary member by urging the first flange and the second flange to the press direction.

6. The heating apparatus according to claim 1, wherein the stay member is not fixed to the second flange in the longitudinal direction.

7. The heating apparatus according to claim 1, wherein the first flange includes a first holding portion configured to hold a first end of the stay member in the longitudinal direction, wherein the second flange includes a second holding portion configured to hold a second end of the stay member in the longitudinal direction, wherein a gap is provided between the first end of the stay member and the first flange in the longitudinal direction, and wherein a gap is provided between the second end of the stay member and the second flange in the longitudinal direction.

8. An image forming apparatus comprising:

an image forming unit configured to form an image on a recording material; and the heating apparatus according to claim 1.

* * * * *